US011895407B2

(12) United States Patent
Nohara et al.

(10) Patent No.: US 11,895,407 B2
(45) Date of Patent: Feb. 6, 2024

(54) IMAGING DEVICE AND IMAGING METHOD

(71) Applicant: SONY GROUP CORPORATION, Tokyo (JP)

(72) Inventors: Fuminori Nohara, Tokyo (JP); Tatsuya Tanaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/597,667

(22) PCT Filed: Jul. 10, 2020

(86) PCT No.: PCT/JP2020/026972
§ 371 (c)(1),
(2) Date: Jan. 17, 2022

(87) PCT Pub. No.: WO2021/015000
PCT Pub. Date: Jan. 28, 2021

(65) Prior Publication Data
US 2022/0263993 A1  Aug. 18, 2022

(30) Foreign Application Priority Data
Jul. 24, 2019  (JP) .................................. 2019-136103

(51) Int. Cl.
*H04N 23/73*  (2023.01)
*H04N 23/66*  (2023.01)
(Continued)

(52) U.S. Cl.
CPC .............. *H04N 23/73* (2023.01); *H04N 23/66* (2023.01); *H04N 23/667* (2023.01); *H04N 25/42* (2023.01)

(58) Field of Classification Search
CPC ...... H04N 23/73; H04N 23/66; H04N 23/667; H04N 25/42; H04N 23/54; H04N 23/50
See application file for complete search history.

(56) References Cited

U.S. PATENT DOCUMENTS

2004/0169737 A1  9/2004  Udagawa
2017/0019604 A1*  1/2017  Kim .................... H04N 23/698
(Continued)

FOREIGN PATENT DOCUMENTS

JP  2012-244303 A  12/2012
JP  6308129 B2  4/2018
(Continued)

OTHER PUBLICATIONS

International Search Report and Written Opinion of PCT Application No. PCT/JP2020/026972, dated Oct. 13, 2020, 09 pages of ISRWO.

(Continued)

*Primary Examiner* — Ahmed A Berhan
(74) *Attorney, Agent, or Firm* — CHIP LAW GROUP

(57) ABSTRACT

The present disclosure relates to an imaging device and an imaging method capable of shortening an imaging interval in high-speed continuous imaging. A temporary memory, which temporarily stores image data transferred from an image sensor and then transfers the image data to a main memory, in a case where high-speed continuous imaging is instructed, sequentially stores a plurality of pieces of the image data transferred from the image sensor at a predetermined speed in a state where the transfer of the image data to the main memory is stopped, and then sequentially transfers the plurality of pieces of stored image data to the main memory at a speed lower than the predetermined speed. The present disclosure can be applied to an imaging device.

17 Claims, 15 Drawing Sheets

(51) Int. Cl.
*H04N 23/667* (2023.01)
*H04N 25/42* (2023.01)

(56) References Cited

U.S. PATENT DOCUMENTS

| | | | |
|---|---|---|---|
| 2018/0184035 A1* | 6/2018 | Kim | H04N 25/75 |
| 2019/0230268 A1* | 7/2019 | Kobayashi | G03B 7/093 |
| 2021/0152763 A1* | 5/2021 | Kawai | H04N 25/134 |

FOREIGN PATENT DOCUMENTS

| | | |
|---|---|---|
| JP | 2019-036904 A | 3/2019 |
| JP | 2019-092223 A | 6/2019 |
| WO | 2011/104819 A1 | 9/2011 |
| WO | 2019/039404 A1 | 2/2019 |

OTHER PUBLICATIONS

Kuroda, et al., "Over 100 million frames per second high speed global shutter CMOS image sensor", SPIE, Digital Library, 32nd International Congress on High-Speed Imaging and Photonics, Jan. 28, 2019, 06 pages.

Tochigi, et al., "A Global-Shutter CMOS Image Sensor With Readout Speed of 1-Tpixel/s Burst and 780-Mpixel/s Continuous", IEEE, Journal of Solid-State Circuits, vol. 48, No. 1,Jan. 1, 2013 , pp. 329-338.

Extended European Search Report of EP Application No. 20844041.2, dated Jul. 21, 2022, 24 pages.

* cited by examiner

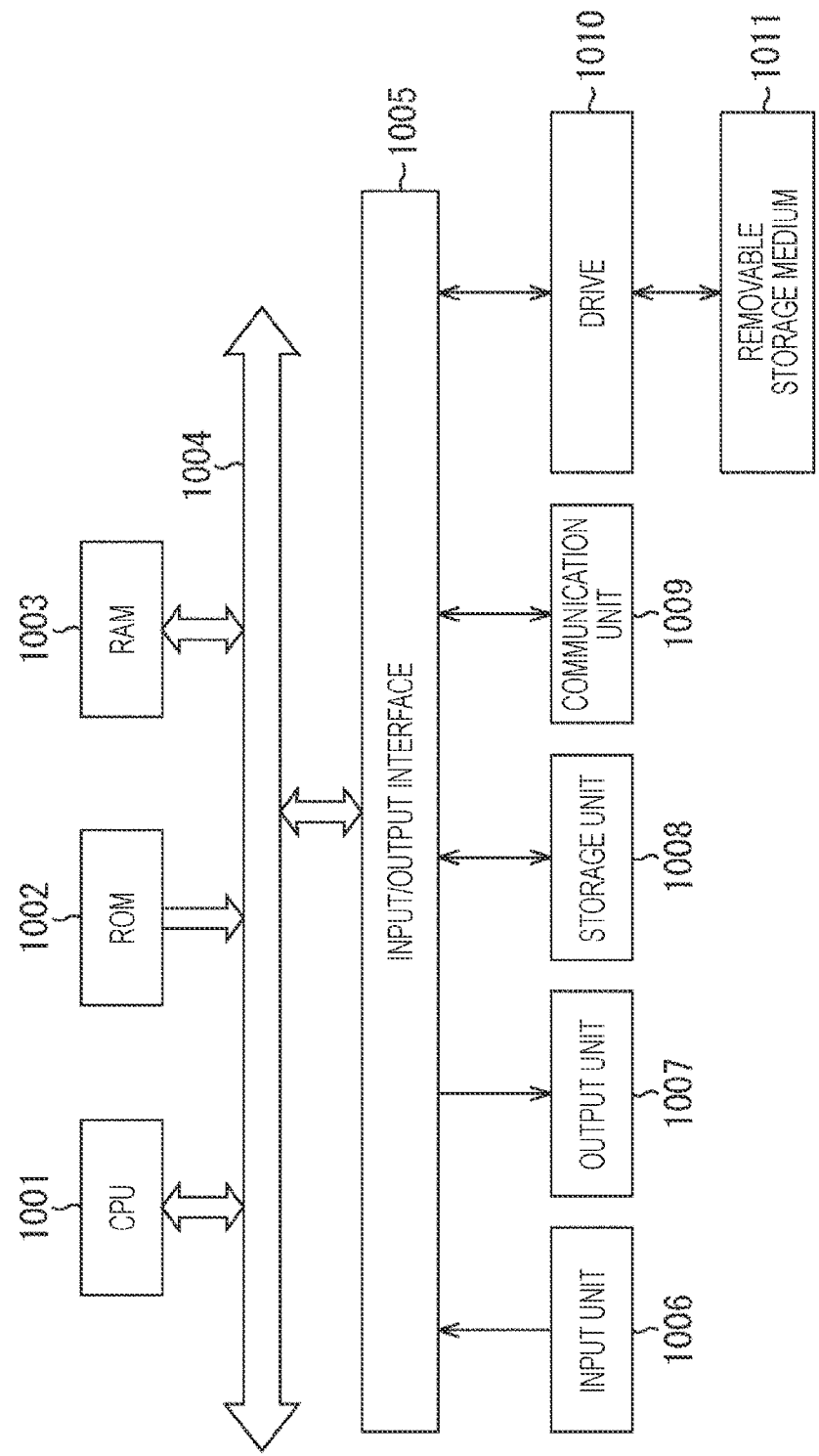

IMAGING DEVICE AND IMAGING METHOD

CROSS REFERENCE TO RELATED APPLICATIONS

This application is a U.S. National Phase of International Patent Application No. PCT/JP2020/026972 filed on Jul. 10, 2020, which claims priority benefit of Japanese Patent Application No. JP 2019-136103 filed in the Japan Patent Office on Jul. 24, 2019. Each of the above-referenced applications is hereby incorporated herein by reference in its entirety.

TECHNICAL FIELD

The present disclosure relates to an imaging device and an imaging method, and more particularly to an imaging device and an imaging method capable of shortening an imaging interval in high-speed continuous imaging.

BACKGROUND ART

A technique of including a memory unit (hereinafter referred to as in-sensor stacked memory) that holds image data in an imaging device, and writing the image data from the imaging device to the in-sensor stacked memory at high speed, thereby reducing focal plane distortion and achieving low power consumption has been proposed (see Patent Document 1).

CITATION LIST

Patent Document

Patent Document 1: Japanese Patent No. 6308129

SUMMARY OF THE INVENTION

Problems to be Solved by the Invention

However, in the technique described in Patent Document 1, it is necessary to perform writing to the in-sensor stacked memory and transfer from the in-sensor stacked memory to an external signal processing engine every time one piece of image data is captured. Therefore, writing speed to the in-sensor stacked memory and transfer speed to the external signal processing engine (I/F speed of a sensor and the external device) are rate-limiting, and there is a limit to shortening an imaging interval (time interval of the captured image).

The present disclosure has been made in view of such a situation, and in particular, can shorten an imaging interval in high-speed continuous imaging.

Solutions to Problems

An imaging device according to one aspect of the present disclosure is an imaging device including: a sensor unit configured to capture an image and transfer the captured image as image data; and a temporary memory configured to temporarily store the image data transferred from the sensor unit and then transfer the image data to a main memory, in which, in a case where high-speed continuous imaging is instructed, the temporary memory sequentially stores a plurality of pieces of the image data transferred from the sensor unit at a predetermined speed in a state where the transfer of the image data to the main memory is stopped, and then sequentially transfers the plurality of pieces of stored image data to the main memory at a speed lower than the predetermined speed.

An imaging method according to one aspect of the present disclosure is an imaging method of an imaging device including a sensor unit configured to capture an image and transfer the captured image as image data, and a temporary memory configured to temporarily store the image data transferred from the sensor unit and then transfer the image data to a main memory, the imaging method including: by the temporary memory, in a case where high-speed continuous imaging is instructed, sequentially storing a plurality of pieces of the image data transferred from the sensor unit at a predetermined speed in a state where the transfer of the image data to the main memory is stopped, and then sequentially transferring the plurality of pieces of stored image data to the main memory at a speed lower than the predetermined speed.

In one aspect of the present disclosure, there is provided an imaging device in which an image is captured and the captured image is transferred as image data, the image data is transferred to a main memory after the image data is temporarily stored, in a case where high-speed continuous imaging is instructed, a plurality of pieces of the image data transferred at a predetermined speed is sequentially stored in a state where the transfer of the image data to the main memory is stopped, and then the plurality of pieces of stored image data is sequentially transferred to the main memory at a speed lower than the predetermined speed.

BRIEF DESCRIPTION OF DRAWINGS

FIG. 15 is a diagram for describing a configuration example of a general-purpose personal computer.

MODE FOR CARRYING OUT THE INVENTION

A favorable embodiment of the present disclosure will be described in detail with reference to the appended drawings below. Note that, in the present specification and drawings, redundant description of configuration elements having substantially the same functional configuration is omitted by providing the same sign.

Hereinafter, modes for carrying out the present technology will be described. Description will be given in the following order.
1. Outline of Present Disclosure
2. First Embodiment
3. Modifications of First Embodiment
4. Second Embodiment
5. Modification of Second Embodiment
6. Example of Execution by Software 1. Outline of Present Disclosure The present disclosure can shorten an imaging interval in high-speed continuous imaging.

First, an outline of the present disclosure will be described.

As a general configuration, an imaging device includes an image sensor including pixels arranged in an array, a main memory that stores image data captured by the image sensor, and a temporary high-speed memory that temporarily stores image data of one image at high speed in a preceding stage of transferring the image data to a main memory.

Figure 1:
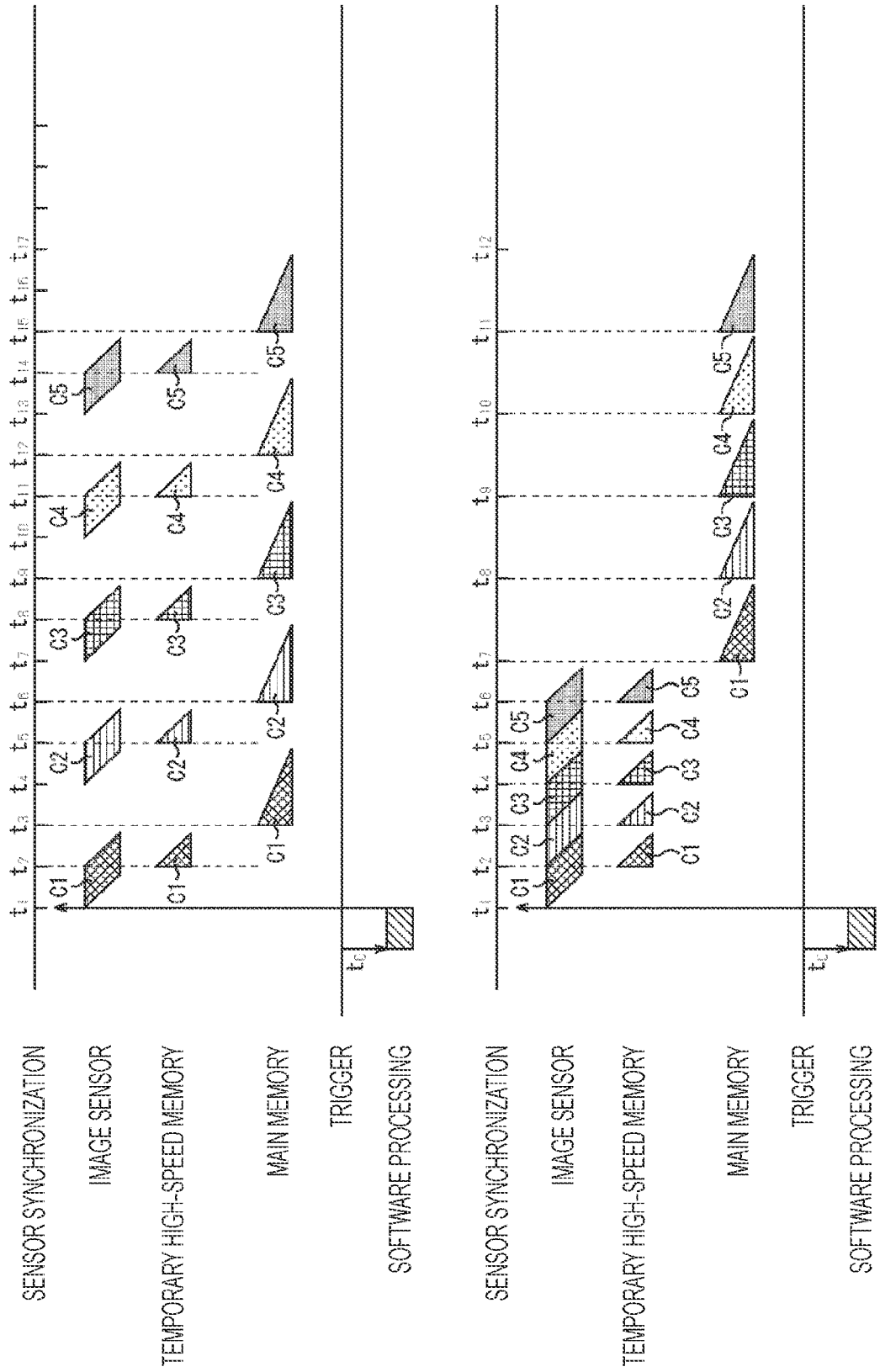
FIG. 1 is a diagram for describing an outline of the present disclosure.

In the case of continuous imaging in the imaging device, for example, the imaging device operates as illustrated in the timing chart in the upper part of FIG. 1.

That is, when a continuous imaging button (not illustrated) or the like is operated at time t0, software that controls the imaging device recognizes an instruction for continuous imaging.

When the software instructs continuous imaging at time t1, the image sensor exposes an image C1 and generates a pixel signal corresponding to the exposure from time t1 to t2.

When the exposure of the image C1 ends at time t2, the image sensor performs analog-to-digital conversion (AD conversion) for the pixel signal of the first image C1 obtained by the exposure and outputs the pixel signal as image data including a digital signal from time t2 to t3.

At the same time, the temporary high-speed memory sequentially stores the image data of the image C1 including the digital signal output from the image sensor from time t2 to t3.

The temporary high-speed memory transfers the stored image data of the first image C1 to the main memory from time t3 to t5.

Here, while the image data of the image C1 is being transferred, the image sensor exposes an image C2 and generates a pixel signal according to the exposure from time t4 to t5.

When the exposure of the image C2 ends at time t5, the image sensor performs AD conversion for the pixel signal of the image C2 obtained by the exposure and outputs the pixel signal as image data including a digital signal from time t5 to t6.

At the same time, the temporary high-speed memory sequentially stores the image data of the image C2 including the digital signal output from the image sensor from time t5 to t6.

The temporary high-speed memory transfers the stored second image data to the main memory from time t6 to t8.

That is, the image C1 is exposed and transferred to the main memory as image data from time t1 to t5, and the image C2 is exposed and transferred to the main memory as image data from time t4 to t8.

Similarly, image data of an image C3 is exposed and transferred to the main memory as image data from time t7 to t11, image data of an image C4 is exposed and transferred to the main memory as image data from time t10 to t14, and image data of an image C5 is exposed and transferred to the main memory as image data from time t13 to t17.

That is, since the temporary high-speed memory is provided and the image data captured by the image sensor is temporarily stored at high speed, the exposure of the next image can be started from the timing before the transfer of the image data of the previous image to the main memory is completed.

As a result, since the temporary high-speed memory is provided, an imaging interval of consecutive images can be shortened as compared with an imaging device having a configuration in which image data is directly transferred from an image sensor to a main memory.

Note that, in the upper part of FIG. 1, sensor synchronization, the exposure of the image sensor and the analog-to-digital conversion timing, the storage timing of the temporary high-speed memory, the storage timing of the main memory, the timing of imaging trigger, and the timing of software processing are illustrated from the top.

However, in the case where the operation as illustrated in the upper part of FIG. 1 is performed, the imaging interval cannot be shortened due to rate-limiting of the transfer speed from the image sensor to the temporary high-speed memory and the transfer speed from the temporary high-speed memory to the main memory.

Therefore, in the present disclosure, a temporary high-speed memory capable of storing image data of a plurality of images is provided, and in a case where high-speed continuous imaging is instructed, the temporary high-speed memory continuously receives the transfer from the image sensor and store the image data in a case of a storable number of image data, and stops the transfer from the temporary high-speed memory to the main memory during that time.

Then, after the transfer from the image sensor to the temporary high-speed memory is completed, the plurality of pieces of image data stored in the temporary high-speed memory is sequentially transferred to the main memory.

More specifically, as illustrated in the timing chart in the lower part of FIG. 1, when a continuous imaging button (not illustrated) or the like is operated at time t0, software that controls the imaging device recognizes an instruction for continuous imaging.

When the software instructs continuous imaging at time t1, the image sensor exposes an image C1 and generates a pixel signal corresponding to the exposure from time t1 to t2.

When the exposure of the image C1 ends at time t2, the image sensor performs AD conversion for the pixel signal of the image C1 obtained by the exposure and outputs the pixel signal as image data including a digital signal from time t2 to t3.

At the same time, the temporary high-speed memory stores the image data of the image C1 including the digital signal output from the image sensor from time t2 to t3.

Moreover, the image sensor exposes an image C2 and generates a pixel signal according to the exposure from time t2 to t3.

When the exposure of the image C2 ends at time t3, the image sensor performs analog-to-digital conversion for the pixel signal of the image C2 obtained by the exposure and outputs the pixel signal as image data including a digital signal from time t3 to t4.

At the same time, the temporary high-speed memory stores the image data of the image C2 including the digital signal output from the image sensor from time t3 to t4.

That is, the image C1 is exposed from time t1 to t2, the image data of the image C1 is AD-converted and stored in the temporary high-speed memory while the image C2 is exposed from time t2 to t3, and the image data of the image C2 is AD-converted and stored in the temporary high-speed memory while the image C3 is exposed from time t3 to t4.

Similarly, the image data of the image C3 is AD-converted and stored in the temporary high-speed memory while the image C4 is exposed from time t4 to t5, the image data of the image C4 is AD-converted and stored in the temporary high-speed memory while the image C5 is exposed from time t5 to t6, and the image data of the image C5 is AD-converted and stored in the temporary high-speed memory from time t6 to t7.

Then, the image data of the image C1 is transferred from the temporary high-speed memory to the main memory from time t7 to t8, and the image data of the image C2 is transferred from the temporary high-speed memory to the main memory from time t8 to t9.

Furthermore, the image data of the image C3 is transferred from the temporary high-speed memory to the main memory from time t9 to t10, the image data of the image C4 is transferred from the temporary high-speed memory to the main memory from time t10 to t11, and the image data of the image C5 is transferred from the temporary high-speed memory to the main memory from time t11 to t12.

Note that the timing chart in the lower part of FIG. 1 illustrates an operation example of a case where image data of five images can be stored in the temporary high-speed memory.

That is, according to the operation of the present disclosure, as illustrated in the timing chart in the lower part of FIG. 1, the image capturing interval can be shortened to substantially zero by the number of storable images by the temporary high-speed memory.

2. First Embodiment

Configuration Example of First Embodiment of Imaging Device of Present Disclosure Next, a configuration example of a first embodiment of an imaging device of the present disclosure will be described with reference to FIG. 2.

Figure 2:
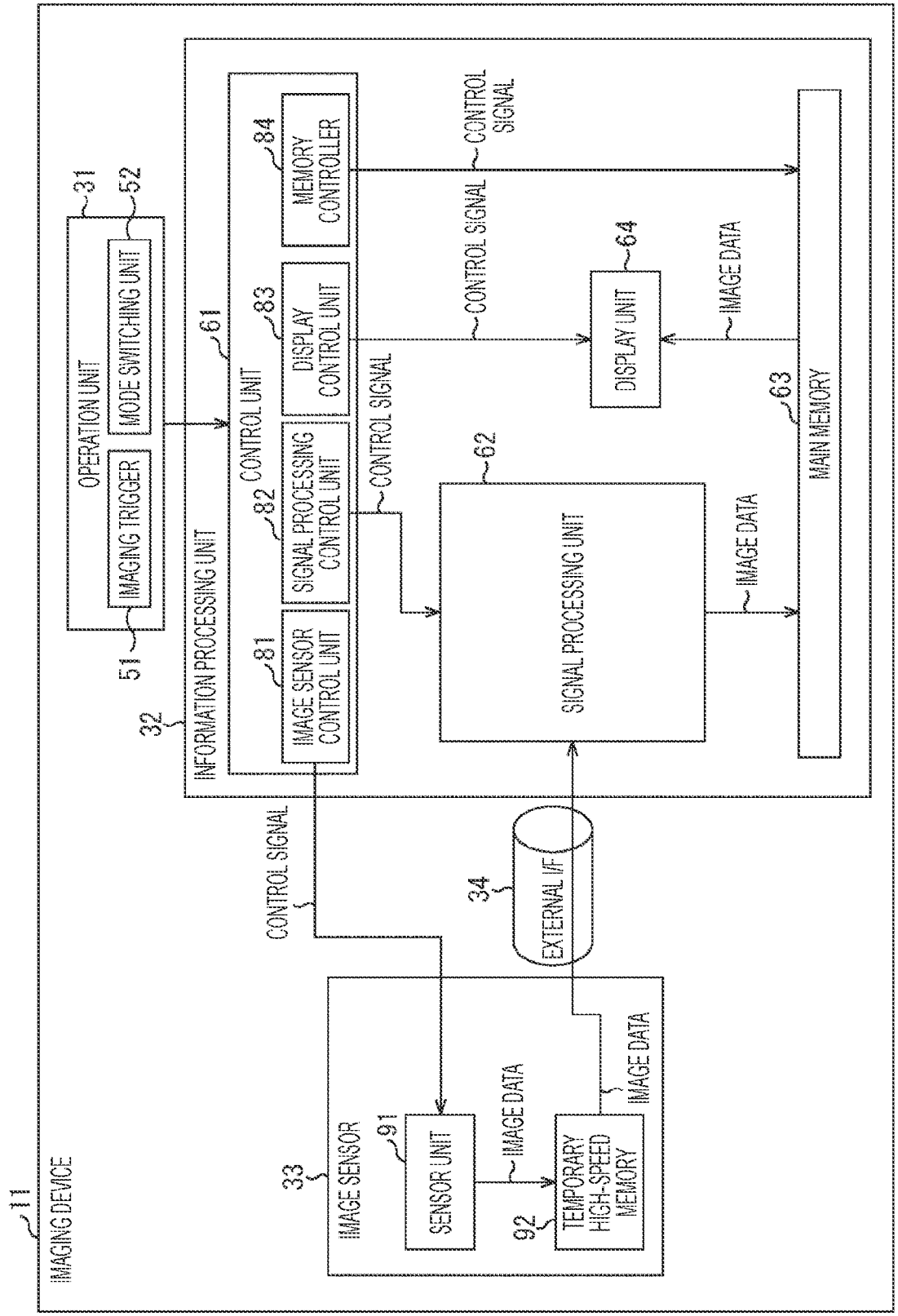
FIG. 2 is a block diagram for describing a configuration example of a first embodiment of an imaging device of the present disclosure.

An imaging device 11 in FIG. 2 includes an operation unit 31, an information processing unit 32, an image sensor 33, and an external interface (I/F) 34.

The operation unit 31 includes physical buttons, keys, dials, and the like operated by a user who operates the imaging device 11, or a mechanism that accepts a touch operation of a displayed button in a case where a display unit 64 or the like accepts a touch operation, and outputs an operation signal according to the user's operation to the information processing unit 32.

More specifically, the operation unit 31 includes an imaging trigger 51 that is operated when any of single imaging, normal continuous imaging, or high-speed continuous imaging is instructed, and a mode switching unit 52 that switches any of the operation modes of the single imaging, the normal continuous imaging, and the high-speed continuous imaging of the imaging trigger 51. When instructing the single imaging to capture one image by one operation of the imaging trigger 51, the user switches the operation mode to the single imaging by the mode switching unit 52 and operates the imaging trigger 51 to instruct the single imaging. Similarly, when instructing the normal continuous imaging, the user switches the operation mode to the normal continuous imaging by the mode switching unit 52 and operates the imaging trigger 51 to instruct the normal continuous imaging. Moreover, when instructing the high-speed continuous imaging, the user switches the operation mode to the high-speed continuous imaging by the mode switching unit 52 and operates the imaging trigger 51 to instruct the high-speed continuous imaging. Note that the normal continuous imaging and the high-speed continuous imaging will be described below in detail.

The information processing unit 32 includes, for example, a microcomputer and the like, and controls the entire operation of the imaging device 11 and performs the operation of the image sensor 33 and signal processing and display of the image data captured by the image sensor 33 on the basis of the operation signal from the operation unit 31.

More specifically, the information processing unit 32 includes a control unit 61, a signal processing unit 62, a main memory 63, and a display unit 64.

The control unit 61 controls the entire operation of the information processing unit 32, and includes an image sensor control unit 81, a signal processing control unit 82, a display control unit 83, and a memory controller 84.

The image sensor control unit 81 supplies control signals related to the timing of the start and end of exposure in the image sensor 33 and various types of processing such as AD conversion on the basis of the operation signal from the operation unit 31.

The signal processing control unit 82 controls the signal processing unit 62 to perform signal processing such as demosaic processing and gain adjustment for the image data supplied from the image sensor 33 via the external I/F 34, and outputs the image data to the main memory 63 for storage.

The display control unit 83 controls the display unit 64 to read and display the image data stored in the main memory 63.

The memory controller 84 controls the main memory 63 to store the image data supplied from the image sensor 33 via the external I/F 34 and the signal processing unit 62.

The signal processing unit 62 is controlled by the signal processing control unit 82, applies the signal processing such as demosaic processing and gain adjustment to the image data supplied from the image sensor 33 via the external I/F 34, and outputs the processed image data to the main memory 63.

The main memory 63 is controlled by the memory controller 84 of the control unit 61, stores the image data supplied from the image sensor 33 via the external I/F 34 and the signal processing unit 62, and outputs the stored image data to the display unit 64 to display the image data.

Furthermore, the main memory 63 is controlled by the memory controller 84, and stores the image data in an external storage medium (not illustrated) as necessary.

The display unit 64 includes a liquid crystal display (LCD) or an organic electro-luminescence (EL), and is controlled by the display control unit 83 to display the image data stored in the main memory 63.

The image sensor 33 generates a pixel signal of a high-definition image according to incident light, performs analog-to-digital (AD) conversion for the pixel signal, and then outputs the pixel signal to the information processing unit 32 via the external I/F 34 as image data including a digital signal of the high-definition image.

More specifically, the image sensor 33 includes a sensor unit 91 and a temporary high-speed memory 92.

The sensor unit 91 generates the pixel signal corresponding to an amount of light received in units of pixels arranged in an array, performs the AD conversion, and outputs the pixel signal as the image data of the high-definition image including the digital signal to the temporary high-speed memory 92 for storage.

The temporary high-speed memory 92 includes, for example, a memory formed as a structure integrated with the sensor unit 91 in a stacked state, acquires and stores the image data of the high-definition image supplied from the sensor unit 91 at high speed, and transfers the stored image data to the main memory 63 via the external I/F 34 and the signal processing unit 62 of the information processing unit 32.

Furthermore, the temporary high-speed memory 92 is configured to be able to store a plurality of pieces of image data of at least two images or more.

That is, the transfer speed at which the image data is transferred from the sensor unit 91 to the temporary high-speed memory 92 is higher than the transfer speed at which the image data is transferred from the temporary high-speed memory 92 to the main memory 63 via the external I/F 34 and the signal processing unit 62 of the information processing unit 32.

Therefore, the image data (captured image data) obtained by exposure in the sensor unit 91 can be output from the sensor unit 91 at higher speed than a case where the temporary high-speed memory 92 is not provided, and thus it is possible to shorten the imaging interval in the continuous imaging.

Moreover, since the temporary high-speed memory 92 can store a plurality of pieces of image data, in a case where continuous imaging is instructed, the sensor unit 91 repeats the operation of performing exposure for the next image at the same time with transferring the captured image data to the temporary high-speed memory 92 when the exposure for a predetermined time ends, and performing exposure for the further next image at the same time with transferring the captured next image data to the temporary high-speed memory 92 when the exposure for the predetermined time ends again.

During the operation, the temporary high-speed memory 92 does not transfer the image data to the main memory 63, and continuously receives transfer of the image data in the sensor unit 91 and stores the plurality of pieces of image data.

Then, the temporary high-speed memory 92 sequentially transfers the plurality of pieces of image data to the main memory 63 at the timing when the continuous imaging ends.

With such a configuration, the imaging interval in the continuous imaging can be made substantially zero.

Operation Example of Normal Continuous Imaging

Next, an operation example of continuous imaging when the temporary high-speed memory 92 can store only one image of image data will be described with reference to the timing chart of FIG. 3.

Note that, hereinafter, the continuous imaging when the temporary high-speed memory 92 can store only one image of image data is also referred to as normal continuous imaging. In contrast, the continuous imaging when the temporary high-speed memory 92 can store a plurality of pieces of image data is also referred to as high-speed continuous imaging.

Furthermore, in FIG. 3, an operation example in a case of performing the normal continuous imaging for three images C11 to C13 will be described, and it is assumed that the user operates the mode switching unit 52 to set the operation mode to the normal continuous imaging and operates the imaging trigger 51 to instruct the normal continuous imaging.

Figure 3:
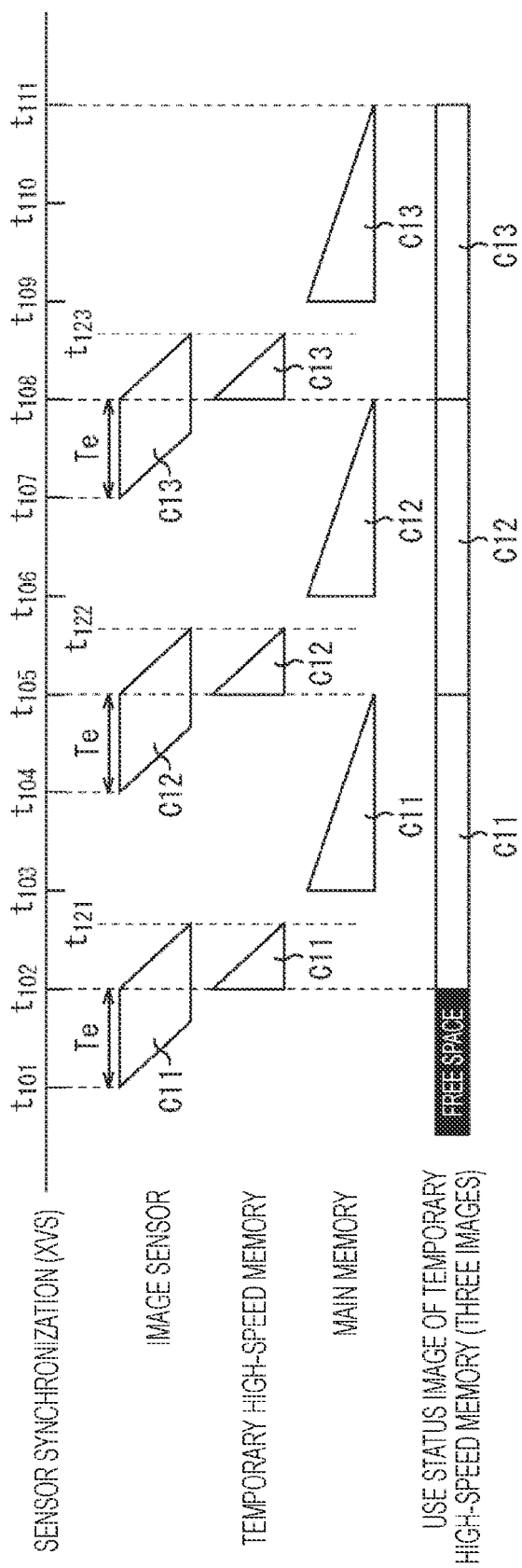
FIG. 3 is a timing chart for describing an operation example of normal continuous imaging.

Moreover, FIG. 3 illustrates, from the top, sensor synchronization timing, timing of the exposure and AD conversion in the image sensor 33, operation timing in the temporary high-speed memory 92, operation timing of the main memory 63, and a use status image in the temporary high-speed memory.

First, when the mode switching unit 52 of the operation unit 31 is operated to set the operation mode to the normal continuous imaging and the imaging trigger 51 is operated to instruct the normal continuous imaging, the image sensor control unit 81 supplies the control signal for instructing the image sensor 33 to perform continuous imaging at time t101 in the sensor synchronization signal.

In response to the signal, the sensor unit 91 of the image sensor 33 performs exposure for an exposure time Te, captures the image C11, and generates the image signal according to the amount of incident light, from time t101 to t102.

When the exposure ends at time t102, the sensor unit 91 performs AD conversion for the image signal of the image C11 and transfers the image signal as image data including a digital signal to the temporary high-speed memory 92 from time t102 to t121.

At the same time, from time t102 to t121, the temporary high-speed memory 92 stores the image data of one image C11 transferred from the sensor unit 91.

From time t103 to t105, the temporary high-speed memory 92 transfers the image data of the image C11 to the main memory 63 via the external I/F 34 and the signal processing unit 62 of the information processing unit 32.

During the processing of transferring the image data of the image C11 from the temporary high-speed memory 92 to the main memory 63, the sensor unit 91 performs exposure for the exposure time Te, captures the image C12, and generates the image signal according to the amount of incident light, from time t104 to t105.

When the exposure ends at time t105, the sensor unit 91 performs AD conversion for the image signal of the image C12 and transfers the image signal as image data including a digital signal to the temporary high-speed memory 92 from time t105 to t122.

At the same time, from time t105 to t122, the temporary high-speed memory 92 discards the image data of the image C11 and stores the image data of one image C12 transferred from the sensor unit 91.

From time t106 to t108, the temporary high-speed memory 92 transfers the image data of the image C12 to the main memory 63 via the external I/F 34 and the signal processing unit 62 of the information processing unit 32.

During the processing of transferring the image data of the image C12 from the temporary high-speed memory 92 to the main memory 63, the sensor unit 91 performs exposure for the exposure time Te, captures the image C13, and generates the image signal according to the amount of incident light, from time t107 to t108.

When the exposure ends at time t108, the sensor unit 91 performs AD conversion for the image signal of the image C13 and transfers the image signal as image data including a digital signal to the temporary high-speed memory 92 from time t108 to t123.

At the same time, from time t108 to t123, the temporary high-speed memory 92 discards the image data of the image C12 and stores the image data of one image C13 transferred from the sensor unit 91.

From time t109 to t111, the temporary high-speed memory 92 transfers the image data of the image C11 to the main memory 63 via the external I/F 34 and the signal processing unit 62 of the information processing unit 32.

That is, the temporary high-speed memory 92 stores the image data of the image C11 from time t102 to t105, stores the image data of the image C12 from time t105 to t108, and stores the image data of the image C13 from time t108 to t111.

Thereby, the processing of transferring the image data of the image C11 from the temporary high-speed memory 92 to the main memory 63 and the exposure of the image C12 are simultaneously performed from time t104 to 105, and the processing of transferring the image data of the image C12 from the temporary high-speed memory 92 to the main memory 63 and the exposure of the image C13 are simultaneously performed from time t107 to 107.

As a result, when the operation mode is set to the normal continuous imaging by the mode switching unit 52, the imaging interval can be shortened by the exposure of different images and the transfer to the main memory 63 being simultaneously performed while the imaging trigger 51 is operated.

However, in a case where the image data that can be stored in the temporary high-speed memory 92 is one image, new image data cannot be stored until the image data stored in the temporary high-speed memory 92 is transferred to the main memory 63.

That is, the transfer speed of the image data from the sensor unit 91 to the temporary high-speed memory 92 and the transfer speed of the image data from the temporary high-speed memory 92 to the main memory 63 become the rate-limiting of the imaging interval.

Therefore, in the present disclosure, the capacity of the image data that can be stored in the temporary high-speed memory 92 is set to a plurality of images, and the image data supplied from the sensor unit 91 is continuously stored by the plurality of images in a state where transfer of the image data to the main memory 63 is stopped until the plurality of images of the image data is stored in the temporary high-speed memory 92. Then, the plurality of images of the image data stored in the temporary high-speed memory 92 is sequentially transferred to the main memory 63 after the transfer from the sensor unit 91 to the temporary high-speed memory 92 is completed.

With such processing, the transfer speed of the image data from the sensor unit 91 to the temporary high-speed memory 92 and the transfer speed of the image data from the temporary high-speed memory 92 to the main memory 63 is no longer the rate-limiting of the imaging interval.

The imaging interval of the images continuously captured at high speed can be made substantially zero up to the number of images storable in the temporary high-speed memory 92. The imaging interval can be shortened and the images can be appropriately captured even for a high-speed object.

Operation Example when Continuously Capturing Images with Different Exposure Times at High Speed Next, an operation example of high-speed continuous imaging in which the temporary high-speed memory 92 corresponding to the imaging device 11 of the present disclosure can store a plurality of images of image data and continuously captures images with different exposure times will be described with reference to the timing chart of FIG. 4.

Note that, in FIG. 4, it is assumed that image data of three images can be stored in the temporary high-speed memory 92, and an operation of a case of continuously capturing three images C21 to C23 with the different exposure times at high speed will be described. Moreover, in the temporary high-speed memory 92, the high-speed continuous imaging in the state where image data of three images can be stored is processing of a case where the mode switching unit 52 is operated to set the operation mode to the high-speed continuous imaging and the imaging trigger 51 is operated.

Figure 4:
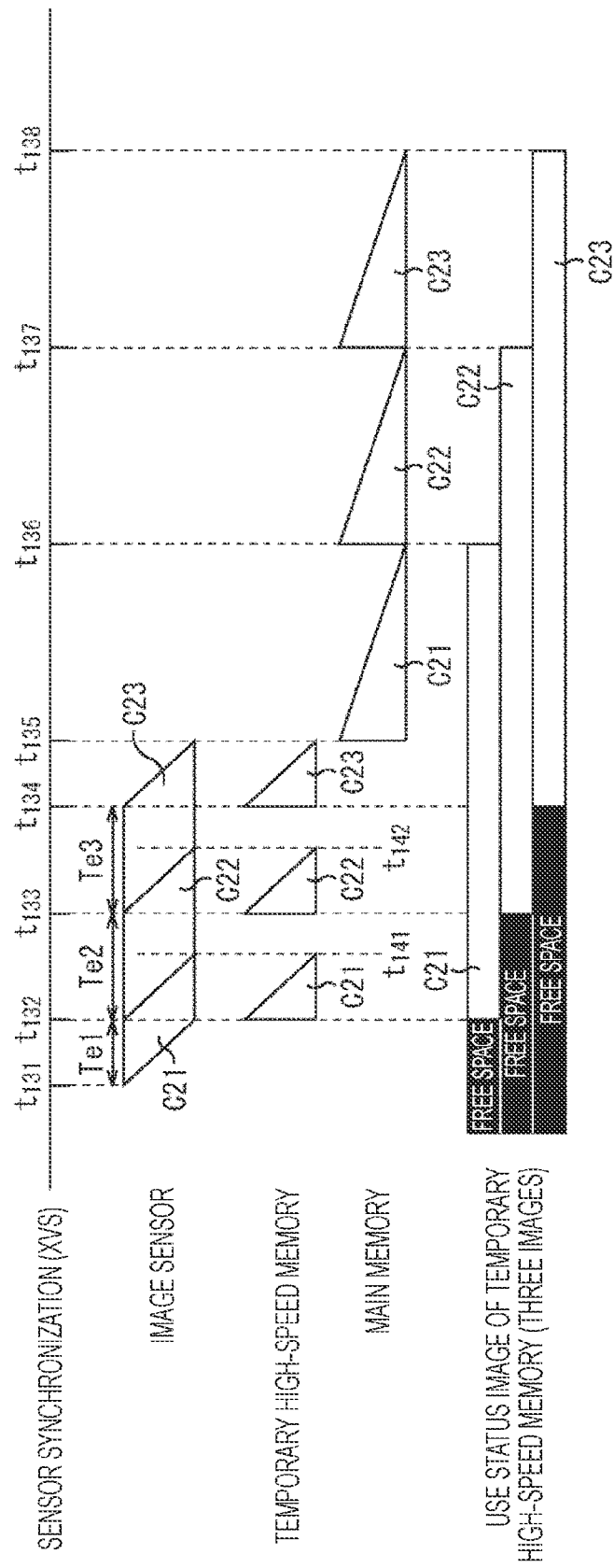
FIG. 4 is a timing chart for describing an operation example of high-speed continuous imaging of continuously capturing images with different exposure times.

Moreover, FIG. 4 illustrates, from the top, sensor synchronization timing, timing of the exposure and AD conversion in the image sensor 33, operation timing in the temporary high-speed memory 92, operation timing of the main memory 63, and a use status image of the three images in the temporary high-speed memory.

First, when the mode switching unit 52 of the operation unit 31 is operated to set the operation mode to the high-speed continuous imaging and the imaging trigger 51 is operated to instruct the high-speed continuous imaging, the image sensor control unit 81 supplies the control signal for instructing the image sensor 33 to perform the high-speed continuous imaging at time t131 in the sensor synchronization signal.

In response to the signal, the sensor unit 91 performs exposure for an exposure time Te1, captures the image C21, and generates the image signal according to the amount of incident light, from time t131 to t132.

When the exposure ends at time t132, the sensor unit 91 performs AD conversion for the image signal of the image C21 and transfers the image signal as image data including a digital signal to the temporary high-speed memory 92 from time t132 to t141.

At the same time, from time t132 to t141, the temporary high-speed memory 92 stores the image data of one image C21 transferred from the sensor unit 91.

Moreover, in parallel, the sensor unit 91 performs exposure for an exposure time Te2, captures the image C22, and generates the image signal according to the amount of incident light, from time t132 to t133.

When the exposure ends at time t133, the sensor unit 91 performs AD conversion for the image signal of the image C22 and transfers the image signal as image data including a digital signal to the temporary high-speed memory 92 from time t133 to t142.

At the same time, from time t133 to t142, the temporary high-speed memory 92 stores the image data of one image C22 transferred from the sensor unit 91.

That is, at and after time t133, the image data of two images C21 and C22 are stored in the temporary high-speed memory 92.

Moreover, in parallel, the sensor unit 91 performs exposure for an exposure time Te3, captures the image C23, and generates the image signal according to the amount of incident light, from time t133 to t134.

When the exposure ends at time t134, the sensor unit 91 performs AD conversion for the image signal of the image C23 and transfers the image signal as image data including a digital signal to the temporary high-speed memory 92 from time t134 to t135.

At the same time, from time t134 to t135, the temporary high-speed memory 92 stores the image data of one image C23 transferred from the sensor unit 91.

That is, at and after time t134, the image data of three images C21 to C23 are stored in the temporary high-speed memory 92.

When the image data of the image C23 is transferred to the temporary high-speed memory 92 at time t135, the temporary high-speed memory 92 transfers the image data of the image C21 to the main memory 63 via the external I/F 34 and the signal processing unit 62 of the information processing unit 32 from time t135 to t136.

Next, from time t136 to t137, the temporary high-speed memory 92 transfers the image data of the image C22 to the main memory 63 via the external I/F 34 and the signal processing unit 62 of the information processing unit 32.

Moreover, from time t137 to t138, the temporary high-speed memory 92 transfers the image data of the image C23 to the main memory 63 via the external I/F 34 and the signal processing unit 62 of the information processing unit 32.

That is, in the series of processing, the temporary high-speed memory 92 stores the image data of the image C21 from time t132 to t136, the image data of the image C22 from time t133 to t137, and the image data of the image C21 from time t134 to t138.

In other words, when the high-speed continuous imaging is instructed, the image data of the three images C21 to C23 that can be stored in the temporary high-speed memory 92 are stored from time t131 to t135, which is immediately after the instruction is given. Then, thereafter, from time t135 to t138, the image data of the images C21 to C23 are sequentially transferred to the main memory 63.

By the above processing, the imaging intervals of the images C21 to C23 become substantially zero, and three image data are stored in the temporary high-speed memory 92 and then transferred to the main memory 63.

That is, the imaging interval can be shortened by the number of images that can be stored in the temporary high-speed memory 92 until the imaging interval becomes substantially 0.

Note that the number of image data storable in the temporary high-speed memory 92 may be any number other than three, that is, two or more, as long as the number is a physically storable number.

Operation Example when Continuously Capturing Images with Same Exposure Time at High Speed In the above description, an example in which the exposure times of the images to be continuously captured at high speed are different from each other in the exposure times Te1 to Te3 has been described, but the images may have the same exposure time.

Figure 5:
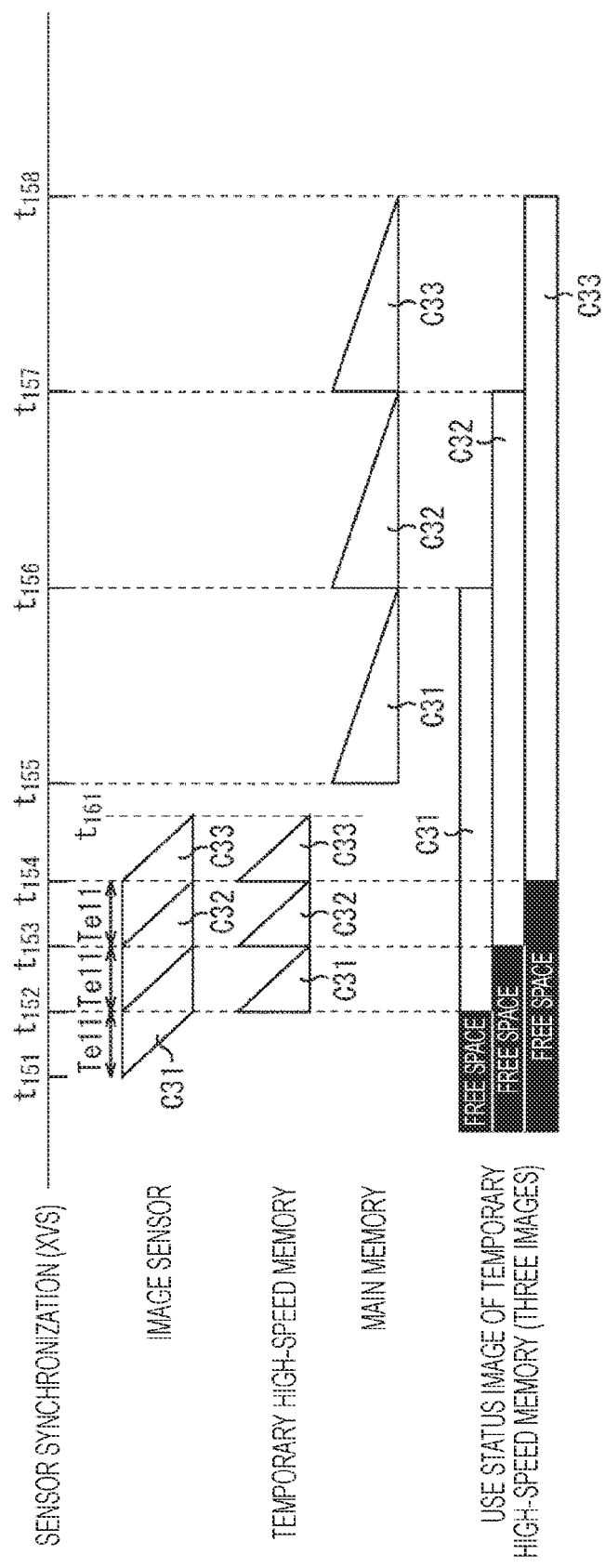
FIG. 5 is a timing chart for describing an operation example of high-speed continuous imaging of continuously capturing images with the same exposure time.

Here, an operation example of when the temporary high-speed memory 92 corresponding to the imaging device 11 of the present disclosure can store a plurality of images of image data and continuously captures images with the same exposure time at high speed will be described with reference to the timing chart of FIG. 5.

Note that, in FIG. 5, it is assumed that image data of three images can be stored in the temporary high-speed memory 92, and an operation example of a case of continuously capturing three images C31 to C33 with the same exposure time at high speed will be described.

First, when the mode switching unit 52 of the operation unit 31 is operated to set the operation mode to the high-speed continuous imaging and the imaging trigger 51 is operated to instruct the high-speed continuous imaging, the image sensor control unit 81 supplies the control signal for instructing the image sensor 33 to perform the high-speed continuous imaging at time t151 in the sensor synchronization signal.

In response to the signal, the sensor unit 91 performs exposure for an exposure time Te11, captures the image C31, and generates the image signal according to the amount of incident light, from time t151 to t152.

When the exposure ends at time t152, the sensor unit 91 performs AD conversion for the image signal of the image C31 and transfers the image signal as image data including a digital signal to the temporary high-speed memory 92 from time t152 to t153.

At the same time, from time t152 to t153, the temporary high-speed memory 92 stores the image data of one image C31 transferred from the sensor unit 91.

Moreover, in parallel, the sensor unit 91 performs exposure for the exposure time Te11, captures the image C32, and generates the image signal according to the amount of incident light, from time t152 to t153.

When the exposure ends at time t153, the sensor unit 91 performs AD conversion for the image signal of the image C32 and transfers the image signal as image data including a digital signal to the temporary high-speed memory 92 from time t153 to t154.

At the same time, from time t153 to t154, the temporary high-speed memory 92 stores the image data of one image C32 transferred from the sensor unit 91.

That is, at and after time t153, the image data of two images C31 and C32 are stored in the temporary high-speed memory 92.

Moreover, in parallel, the sensor unit 91 performs exposure for the exposure time Te11, captures the image C33, and generates the image signal according to the amount of incident light, from time t153 to t154.

When the exposure ends at time t154, the sensor unit 91 performs AD conversion for the image signal of the image C33 and transfers the image signal as image data including a digital signal to the temporary high-speed memory 92 from time t154 to t161.

At the same time, from time t154 to t161, the temporary high-speed memory 92 stores the image data of one image C33 transferred from the sensor unit 91.

That is, at and after time t154, the image data of three images C31 to C33 are stored in the temporary high-speed memory 92.

When the image data of the image C23 is transferred to the temporary high-speed memory 92 at time t161, the temporary high-speed memory 92 transfers the image data of the image C31 to the main memory 63 via the external I/F 34 and the signal processing unit 62 of the information processing unit 32 from time t155 to t156.

Next, from time t156 to t157, the temporary high-speed memory 92 transfers the image data of the image C32 to the main memory 63 via the external I/F 34 and the signal processing unit 62 of the information processing unit 32.

Moreover, from time t157 to t158, the temporary high-speed memory 92 transfers the image data of the image C33 to the main memory 63 via the external I/F 34 and the signal processing unit 62 of the information processing unit 32.

At this time, the temporary high-speed memory 92 stores the image data of the image C31 from time t152 to t156, the image data of the image C32 from time t153 to t157, and the image data of the image C33 from time t154 to t158.

That is, from time t154 to t156, the image data of the three images C31 to C33 are stored in the temporary high-speed memory 92, and are sequentially transferred to the main memory 63 thereafter.

By the above processing, the imaging intervals of the images C31 to C33 become substantially zero, and three image data are stored in the temporary high-speed memory 92 and then sequentially transferred to the main memory 63.

That is, the imaging interval can be shortened by the number of images that can be stored in the temporary high-speed memory 92 until the imaging interval becomes substantially 0.

Operation Example of High-speed Continuous Imaging when Configuring Ring Buffer by Temporary High-speed Memory In the above description, an example has been described in which, in the case where the high-speed continuous imaging is instructed, the image data of the storable number of images is acquired from the sensor unit 91 and stored in the temporary high-speed memory 92, and then the image data of the plurality of images stored in the temporary high-speed memory 92 is sequentially transferred to the main memory 63.

However, a ring buffer may be configured by the temporary high-speed memory 92, and processing of overwriting image data in order from the oldest image data with the latest image data may be repeated as long as the high-speed continuous imaging is being continuously instructed so that only the most recent image data is stored, and after the high-speed continuous imaging ends, a plurality of pieces of most recent image data stored in the temporary high-speed memory 92 may be transferred to the main memory 63.

Here, an operation example of high-speed continuous imaging of a case where a ring buffer is configured by the temporary high-speed memory 92 will be described with reference to the timing chart of FIG. 6.

Note that it is assumed that three images of image data can be stored in the temporary high-speed memory 92, and for more images of image data, the processing of sequentially overwriting the oldest image data with the latest image data is repeated.

Furthermore, in this operation example, an example of continuously capturing six images C51 to C56 at high speed will be described.

Figure 6:
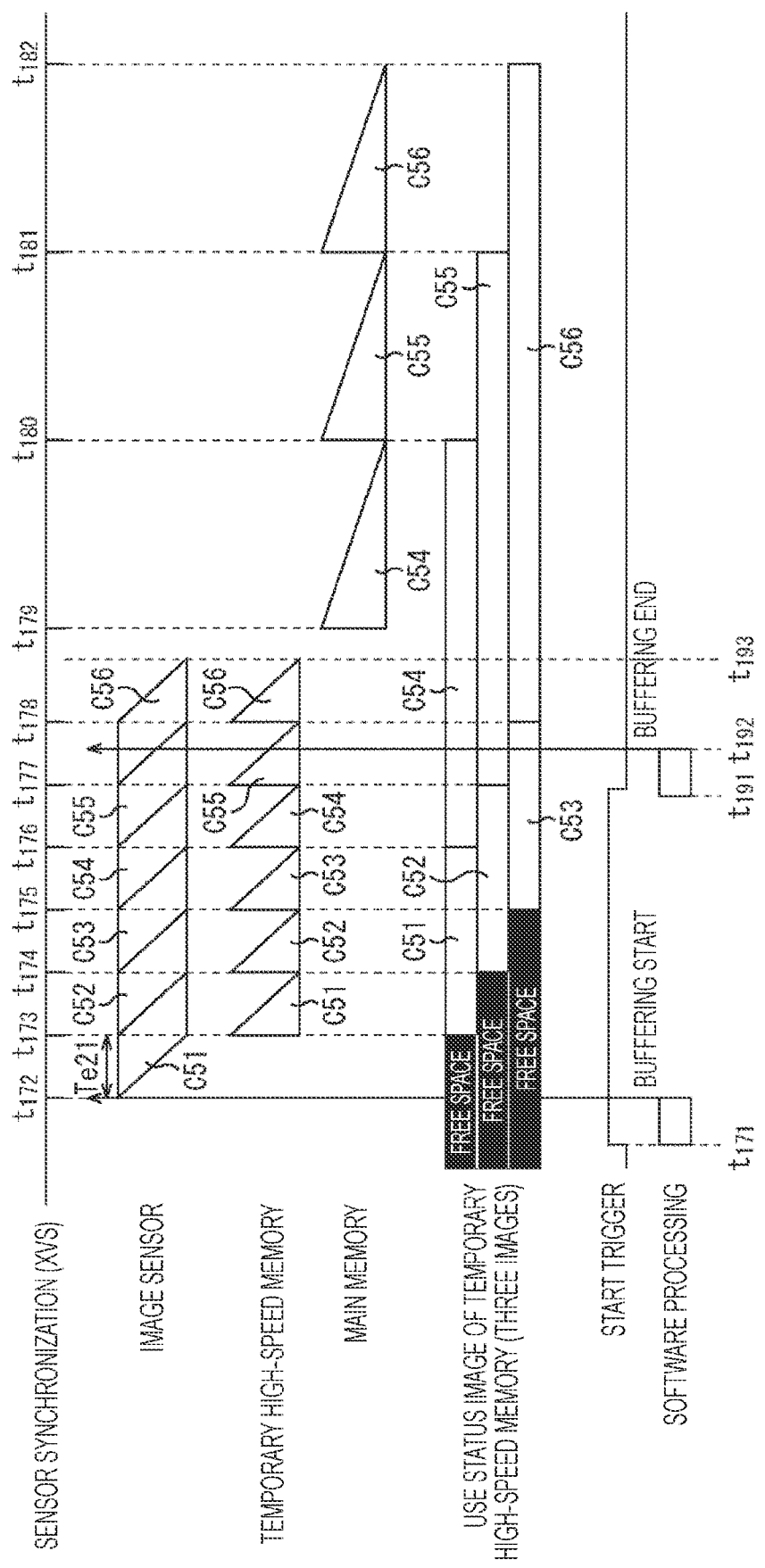
FIG. 6 is a timing chart for describing an operation example of high-speed continuous imaging when configuring a ring buffer.

Moreover, FIG. 6 illustrates, from the top, the sensor synchronization timing, the timing of the exposure and AD conversion in the image sensor 33, the operation timing in the temporary high-speed memory 92, the operation timing of the main memory 63, the use status image of the three images in the temporary high-speed memory, timing at which the imaging trigger 51 is operated (start trigger), and software processing timing in the control unit 61.

That is, when the mode switching unit 52 of the operation unit 31 is operated to set the operation mode to the high-speed continuous imaging and the imaging trigger 51 is operated to instruct the high-speed continuous imaging, the software processing of the control unit 61 of the information processing unit 32 is started at time t171 in the sensor synchronization signal, and the image sensor control unit 81 supplies the control signal for instructing the image sensor 33 to perform the high-speed continuous imaging at time t172.

In response to the signal, the sensor unit 91 performs exposure for an exposure time Te21, captures the image C51, and generates the image signal according to the amount of incident light, from time t172 to t173.

When the exposure ends at time t173, the sensor unit 91 performs AD conversion for the image signal of the image C51 and transfers the image signal as image data including a digital signal to the temporary high-speed memory 92 from time t173 to t174.

At the same time, from time t173 to t174, the temporary high-speed memory 92 stores the image data of one image C51 transferred from the sensor unit 91.

Moreover, in parallel, the sensor unit 91 performs exposure for the exposure time Te21, captures the image C52, and generates the image signal according to the amount of incident light, from time t173 to t174.

When the exposure ends at time t174, the sensor unit 91 performs AD conversion for the image signal of the image C52 and transfers the image signal as image data including a digital signal to the temporary high-speed memory 92 from time t174 to t175.

At the same time, from time t174 to t175, the temporary high-speed memory 92 stores the image data of one image C52 transferred from the sensor unit 91.

That is, at and after time t173, the image data of two images C51 and C52 are stored in the temporary high-speed memory 92.

Moreover, in parallel, the sensor unit 91 performs exposure for the exposure time Te21, captures the image C53, and generates the image signal according to the amount of incident light, from time t174 to t175.

When the exposure ends at time t175, the sensor unit 91 performs AD conversion for the image signal of the image C53 and transfers the image signal as image data including a digital signal to the temporary high-speed memory 92 from time t175 to t176.

At the same time, from time t175 to t176, the temporary high-speed memory 92 stores the image data of one image C53 transferred from the sensor unit 91.

That is, at and after time t175, the image data of three images C51 to C53 are stored in the temporary high-speed memory 92.

Moreover, in parallel, the sensor unit 91 performs exposure for the exposure time Te21, captures the image C54, and generates the image signal according to the amount of incident light, from time t175 to t176.

When the exposure ends at time t176, the sensor unit 91 performs AD conversion for the image signal of the image C54 and transfers the image signal as image data including a digital signal to the temporary high-speed memory 92 from time t176 to t177.

At the same time, from time t176 to t177, when acquiring the image data of one image C54 transferred from the sensor unit 91, the temporary high-speed memory 92 overwrites the image data of the image C51, which is the oldest image data, with the image data of the image C54 and stores the image data because the temporary high-speed memory has already stored three images of image data.

That is, at and after time t176, the image data of three images C52 to C54 are stored in the temporary high-speed memory 92.

Moreover, in parallel, the sensor unit 91 performs exposure for the exposure time Te21, captures the image C55, and generates the image signal according to the amount of incident light, from time t176 to t177.

When the exposure ends at time t177, the sensor unit 91 performs AD conversion for the image signal of the image C55 and transfers the image signal as image data including a digital signal to the temporary high-speed memory 92 from time t177 to t178.

At the same time, from time t177 to t178, when acquiring the image data of one image C55 transferred from the sensor unit 91, the temporary high-speed memory 92 overwrites the image data of the image C52, which is the oldest image data, with the image data of the image C55 and stores the image data because the temporary high-speed memory has already stored three images of image data.

That is, at and after time t177, the image data of three images C53 to C55 are stored in the temporary high-speed memory 92.

Moreover, in parallel, the sensor unit 91 performs exposure for the exposure time Te21, captures the image C56, and generates the image signal according to the amount of incident light, from time t177 to t178.

Here, at time t191, it is assumed that the operation of the imaging trigger 51 is canceled, and the instruction of the high-speed continuous imaging is stopped.

In response to this instruction, at time t192, the image sensor control unit 81 of the control unit 61 instructs the image sensor 33 to stop the high-speed continuous imaging of the currently exposed image C56 and subsequent images by software processing.

When the exposure ends at time t178, the sensor unit 91 performs AD conversion for the image signal of the image C56 and transfers the image signal as image data including a digital signal to the temporary high-speed memory 92 from time t178 to t193.

At the same time, from time t178 to t193, when acquiring the image data of one image C56 transferred from the sensor unit 91, the temporary high-speed memory 92 overwrites the image data of the image C53, which is the oldest image data, with the image data of the image C56 and stores the image data because the temporary high-speed memory has already stored three images of image data.

That is, at and after time t178, the image data of three images C54 to C56 are stored in the temporary high-speed memory 92.

Furthermore, the sensor unit 91 does not perform exposure at and after time t179 in response to the instruction to stop the continuous imaging at time t192.

Furthermore, from time t179 to t180, the temporary high-speed memory 92 transfers the stored image data of the image C54, which is the oldest image data, to the main memory 63 via the external I/F 34 and the signal processing unit 62 of the information processing unit 32 in response to the instruction to stop the continuous imaging at time t192.

Next, from time t180 to t181, the temporary high-speed memory 92 transfers the stored image data of the image C55, which is the oldest image data, to the main memory 63 via the external I/F 34 and the signal processing unit 62 of the information processing unit 32.

Moreover, from time t181 to t182, the temporary high-speed memory 92 transfers the stored image data of the image C56 to the main memory 63 via the external I/F 34 and the signal processing unit 62 of the information processing unit 32.

That is, in the series of processing, the temporary high-speed memory 92 stores the image data of the image C51 from time t173 to t174, the image data of the image C52 from time t174 to t175, and the image data of the image C53 from time t175 to t176.

Moreover, in the temporary high-speed memory 92, the storage area of the image data of the image C51 is overwritten with the image data of the image C54 from time t176 to t177.

Furthermore, the storage area of the image data of the image C52 is overwritten with the image data of the image data C55 from time t177 to t178, and the storage area of the image data of the image C53 is overwritten with the image data of the image data C56 from time t178 to t193.

Then, when stop of the continuous imaging is instructed at time t172, the image data of the three images C54 to C56 stored in the temporary high-speed memory 92 at that timing is sequentially transferred to the main memory 63.

That is, the image data of the image C54 is transferred to the main memory 63 from time t179 to t180, the image data of the image C55 is transferred to the main memory 63 from time t180 to t181, and the image data of the image C56 is transferred to the main memory 63 from time t181 to t182.

By the above processing, the image data of the most recent three images are stored in the temporary high-speed memory 92 in the state where the imaging interval is substantially zero as long as the state of the instruction of the high-speed continuous imaging continues until the end of the high-speed continuous imaging is instructed. Then, when the end of the high-speed continuous imaging is instructed, the three image data stored at the timing, that is, the most recent three image data at the timing when the end of the high-speed continuous imaging is instructed are transferred to the main memory 63.

That is, in FIG. 6, when the mode switching unit 52 is operated and the operation mode is the high-speed continuous imaging, the imaging trigger 51 is operated and the images C51 to C56 are sequentially stored in the main memory 63 in a state where the imaging interval is substantially zero, and at this time, the most recent three pieces of image data are stored, from time t171 to 178 in which the high-speed continuous imaging is instructed.

Then, the three image data of C54 to C56 stored in the temporary high-speed memory 92 at the timing when the high-speed continuous imaging ends are sequentially transferred to the main memory 63.

As a result, the imaging interval can be shortened until the imaging interval becomes substantially 0 by the number of images that can be stored in the temporary high-speed memory 92, and the temporary high-speed memory 92 functions as a ring buffer and can store the most recent image data as many as the number of images storable in the temporary high-speed memory 92 as long as the high-speed continuous imaging is instructed.

Then, the image data stored in the temporary high-speed memory 92 can be sequentially transferred to the main memory 63 at the timing when stop of the high-speed continuous imaging is instructed.

Operation Example when Switching and Using Normal Continuous Imaging and High-speed Continuous Imaging In the above, an example in which the temporary high-speed memory 92 functions as a ring buffer has been described. In the case where the temporary high-speed memory 92 functions as a ring buffer, the image data to be transferred to the main memory 63 is only the most recent image data of the number storable in the temporary high-speed memory 92 at the timing when the end of the high-speed continuous imaging is instructed.

That is, in a case where the number of images captured by the high-speed continuous imaging instruction is larger than the number of images storable in the temporary high-speed memory 92, the image data around the timing at which the high-speed continuous imaging starts is overwritten with subsequent image data and is substantially erased, and is not transferred to the main memory 63.

Therefore, the two types of continuous imaging: the normal continuous imaging and the high-speed continuous imaging may be switched and used.

In switching the normal continuous imaging and the high-speed continuous imaging, when the mode switching unit 52 is operated to set the operation mode to the normal continuous imaging, an operation signal instructing the normal continuous imaging is output when the imaging trigger 51 is operated, and when the mode switching unit 52 is operated to set the operation mode to the high-speed continuous imaging, an operation signal is output for the high-speed continuous imaging when the imaging trigger 51 is operated. That is, the mode switching unit 52 is operated in the state where the imaging trigger 51 is operated to switch the operation mode, so that the normal continuous imaging and the high-speed continuous imaging is switched.

Figure 7:
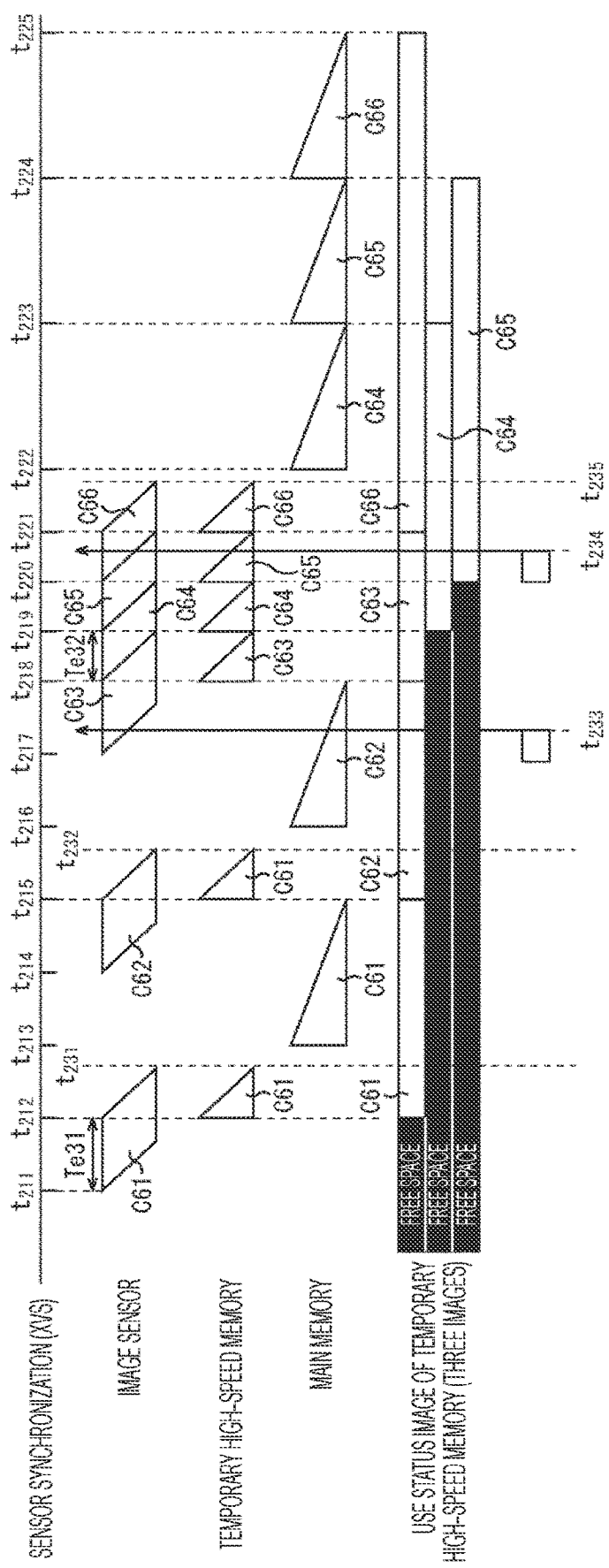
FIG. 7 is a timing chart for describing an operation example when switching the normal continuous imaging and the high-speed continuous imaging.

Here, an operation example of when the normal continuous imaging and the high-speed continuous imaging are switched and used will be described with reference to the timing chart of FIG. 7.

First, when the mode switching unit 52 of the operation unit 31 is operated to set the operation mode to the normal continuous imaging and the imaging trigger 51 is operated to instruct the normal continuous imaging, the image sensor control unit 81 supplies the control signal for instructing the image sensor 33 to perform the normal continuous imaging at time t211 in the sensor synchronization signal.

In response to the signal, the sensor unit 91 performs exposure for an exposure time Te31, captures the image C61, and generates the image signal according to the amount of incident light, from time t211 to t212.

When the exposure ends at time t212, the sensor unit 91 performs AD conversion for the image signal of the image C61 and transfers the image signal as image data including a digital signal to the temporary high-speed memory 92 from time t212 to t231.

At the same time, from time t212 to t231, the temporary high-speed memory 92 stores the image data of one image C61 transferred from the sensor unit 91.

From time t213 to t215, the temporary high-speed memory 92 transfers the image data of the image C61 to the main memory 63 via the external I/F 34 and the signal processing unit 62 of the information processing unit 32.

During the processing of transferring the image data of the image C61 from the temporary high-speed memory 92 to the main memory 63, the sensor unit 91 performs exposure for the exposure time Te31, captures the image C62, and generates the image signal according to the amount of incident light, from time t214 to t215.

When the exposure ends at time t215, the sensor unit 91 performs AD conversion for the image signal of the image C62 and transfers the image signal as image data including a digital signal to the temporary high-speed memory 92 from time t215 to t232.

At the same time, from time t215 to t232, the temporary high-speed memory 92 stores the image data of one image C62 transferred from the sensor unit 91.

From time t216 to t218, the temporary high-speed memory 92 transfers the image data of the image C62 to the main memory 63 via the external I/F 34 and the signal processing unit 62 of the information processing unit 32.

During the processing of transferring the image data of the image C62 from the temporary high-speed memory 92 to the main memory 63, the sensor unit 91 performs exposure for the exposure time Te31, captures the image C63, and generates the image signal according to the amount of incident light, from time t217 to t218.

Here, at time t233, it is assumed that the mode switching unit 52 is operated in the state where the imaging trigger 51 is operated, and the operation mode is switched from the normal continuous imaging to the high-speed continuous imaging, so that the instruction of the continuous imaging is switched from the normal continuous imaging to the high-speed continuous imaging.

The image sensor control unit 81 instructs the image sensor 33 to perform the high-speed continuous imaging. As a result, after completion of the imaging of the image C63 and the transfer to the temporary high-speed memory 92, the image sensor 33 uses the temporary high-speed memory 92 as a ring buffer to perform the high-speed continuous imaging.

When the exposure ends at time t218, the sensor unit 91 performs AD conversion for the image signal of the image C63 and transfers the image signal as image data including a digital signal to the temporary high-speed memory 92 from time t218 to t219.

At the same time, from time t218 to t219, the temporary high-speed memory 92 stores the image data of one image C63 transferred from the sensor unit 91.

Moreover, in parallel, the sensor unit 91 performs exposure for an exposure time Te32, captures an image C64, and generates the image signal according to the amount of incident light, from time t218 to t219.

When the exposure ends at time t219, the sensor unit 91 performs AD conversion for the image signal of the image C64 and transfers the image signal as image data including a digital signal to the temporary high-speed memory 92 from time t219 to t220.

At the same time, from time t219 to t220, when acquiring the image data of one image C64 transferred from the sensor unit 91, the temporary high-speed memory 92 stores the image data of the image C64.

That is, at or after time t219, the temporary high-speed memory 92 stores the image data of the two images C63 and C64.

Moreover, in parallel, the sensor unit 91 performs exposure for the exposure time Te32, captures the image C65, and generates the image signal according to the amount of incident light, from time t219 to t220.

When the exposure ends at time t220, the sensor unit 91 performs AD conversion for the image signal of the image C65 and transfers the image signal as image data including a digital signal to the temporary high-speed memory 92 from time t220 to t221.

At the same time, from time t220 to t221, when acquiring the image data of one image C65 transferred from the sensor unit 91, the temporary high-speed memory 92 stores the image data of the image C65.

That is, at or after time t220, the temporary high-speed memory 92 stores the image data of the three images C63 to C65.

Moreover, in parallel, the sensor unit 91 performs exposure for the exposure time Te32, captures the image C66, and generates the image signal according to the amount of incident light, from time t220 to t221.

Here, at time t234, it is assumed that the operation of the imaging trigger 51 is canceled, and the instructions of the normal continuous imaging and the high-speed continuous imaging are stopped.

In response to this instruction, at time t234, the image sensor control unit 81 of the control unit 61 instructs the image sensor 33 to stop the continuous imaging of the currently exposed image C66 and subsequent images by software processing.

When the exposure ends at time t221, the sensor unit 91 performs AD conversion for the image signal of the image C66 and transfers the image signal as image data including a digital signal to the temporary high-speed memory 92 from time t221 to t234.

At the same time, from time t221 to t235, the temporary high-speed memory 92 acquires the image data of one image C66 transferred from the sensor unit 91, the temporary high-speed memory overwrites the image data of the image C63, which is the oldest image data, that is, deletes the image data of the image C63 and stores the image data of the image C66 because the temporary high-speed memory has already stored three images of image data.

That is, at and after time t221, the image data of three images C64 to C66 are stored in the temporary high-speed memory 92.

Furthermore, the sensor unit 91 does not perform exposure at and after time t221 in response to the instruction to stop the continuous imaging at time t234.

Moreover, from time t222 to t223, the temporary high-speed memory 92 transfers the stored image data of the image C64, which is the oldest image data, to the main memory 63 via the external I/F 34 and the signal processing unit 62 of the information processing unit 32 in response to the instruction to stop the continuous imaging at time t234.

Next, from time t223 to t224, the temporary high-speed memory 92 transfers the stored image data of the image C65, which is the oldest image data, to the main memory 63 via the external I/F 34 and the signal processing unit 62 of the information processing unit 32.

Moreover, from time t224 to t225, the temporary high-speed memory 92 transfers the stored image data of the image C66 to the main memory 63 via the external I/F 34 and the signal processing unit 62 of the information processing unit 32.

That is, in the series of processing, the image C61 is captured by the sensor unit 91 from time t211 to t212, the image data of the image C61 is transferred to the temporary high-speed memory 92 from time t212 to t213, and the image data of the image C61 is transferred to the main memory 63 from time t213 to t215.

Furthermore, the image C62 is captured by the sensor unit 91 from time t214 to t215, the image data of the image C62 is transferred to the temporary high-speed memory 92 from time t215 to t216, and the image data of the image C62 is transferred to the main memory 63 from time t216 to t218.

Moreover, the image C63 is captured and the normal continuous imaging is changed to the high-speed continuous imaging from time t217 to t218, and the image data of the image C63 is stored in the temporary high-speed memory 92 from time t218 to t219.

Furthermore, the image C64 is captured from time t218 to t219, and the image data of the image C64 is stored in the temporary high-speed memory 92 from time t219 to t220. At this time, the temporary high-speed memory 92 stores the image data of the images C63 and C64.

Moreover, the image C65 is captured from time t219 to t220, and the image data of the image C65 is stored in the temporary high-speed memory 92 from time t219 to t220. At this time, the temporary high-speed memory 92 stores the image data of the images C63 to C65.

Furthermore, the image C66 is captured from time t220 to t221, and the image data of the image C66 is stored in the temporary high-speed memory 92 from time t220 to t221. At this time, in the temporary high-speed memory 92, the image data of the image C66 is stored in the storage area of the image C63, and the image data of the images C64 to C66 are stored.

Then, when stop of the continuous imaging is instructed at time t234, the image data of the three images C64 to C66 stored in the temporary high-speed memory 92 at that timing is sequentially transferred to the main memory 63.

That is, the image data of the image C64 in the temporary high-speed memory 92 is transferred to the main memory 63 from time t222 to t223, the image data of the image C65 in the temporary high-speed memory 92 is transferred to the main memory 63 from time t223 to t224, and the image data of the image C66 in the temporary high-speed memory 92 is transferred to the main memory 63 from time t224 to t225.

By the above processing, as long as the state in which the instruction of the normal continuous imaging is continued, the processing of capturing an image, the temporary high-speed memory 92 storing the captured one image of image data, and then transferring the image data to the main memory 63 is repeated. As a result, the imaging interval is limited due to rate-limiting by the transfer speed from the sensor unit 91 to the temporary high-speed memory 92 and the transfer speed from the temporary high-speed memory 92 to the main memory 63, but the captured image data can be reliably transferred to the main memory until the end of the normal continuous imaging is instructed.

Furthermore, as long as the state of the instruction of the high-speed continuous imaging continues, the image data of the most recent three images is stored in the temporary high-speed memory 92 in the state in which the imaging interval is substantially zero until the end of the high-speed continuous imaging is instructed, and when the end of the continuous imaging is instructed, the three image data stored at that timing, that is, the most recent three image data at the timing when the end of the continuous imaging is instructed is transferred to the main memory 63.

As a result, by switching and using the normal high-speed imaging and the high-speed normal imaging, it is possible to switch and use imaging of reliably transferring the image data to the main memory 63 although there is a limit to the imaging interval due to rate-limiting based on the transfer speed, and imaging of shortening the imaging interval until the imaging interval substantially becomes 0 although there is a limit to the image data to be recorded.

3. Modifications of First Embodiment

In the above, an example of a configuration in which the sensor unit 91 and the temporary high-speed memory 92 are stacked and integrated in the image sensor 33 so that the image data can be transferred at high speed has been described. However, the sensor unit 91 and the temporary high-speed memory 92 may be separately configured instead of being integrated as long as the image data can be transferred between the sensor unit 91 and the temporary high-speed memory 92 at high speed.

Figure 8:
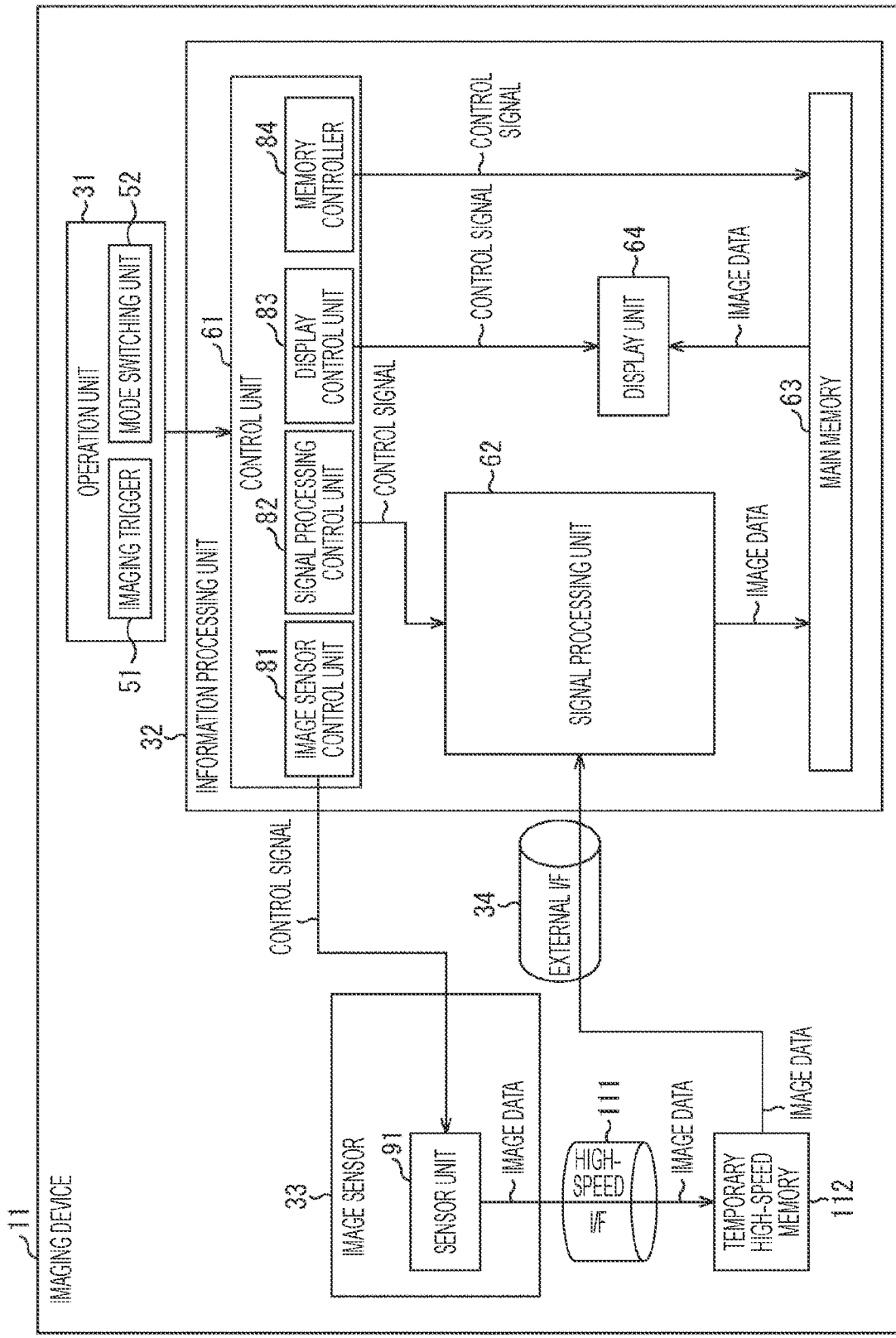
FIG. 8 is a block diagram for describing a modification of the first embodiment of the imaging device of the present disclosure.

For example, as illustrated in the imaging device 11 in FIG. 8, a temporary high-speed memory 112 may be provided outside the image sensor 33 instead of the temporary high-speed memory 92, and the sensor unit 91 and the temporary high-speed memory 112 in the image sensor 33 may be connected by a high-speed I/F 111.

Note that, in the imaging device 11 of FIG. 8, the substantial functions are similar except that the temporary high-speed memory 112 having a similar function is connected to the sensor unit 91 via the high-speed I/F 111 instead of the temporary high-speed memory 92, and thus description thereof will be omitted.

Furthermore, the operation example by the imaging device 11 in FIG. 8 is also similar to that of the imaging device 11 in FIG. 2, and thus description thereof is omitted.

4. Second Embodiment

Configuration Example of Second Embodiment of Imaging Device of Present Disclosure In the above, an example in which only image data including a high-definition image captured by the image sensor 33 is transferred to the information processing unit 32 has been described. However, the image sensor 33 may generate and output image data including a high-definition image and a reduced image (low-resolution image) obtained by thinning pixel data, and display the reduced image (low-resolution image) as a live view image.

Here, a configuration example of a second embodiment of an imaging device in which the image sensor 33 generates and outputs image data including a high-definition image and a reduced image (low-resolution image) obtained by thinning pixel data, and displays the reduced image (low-resolution image) as a live view image will be described with reference to FIG. 9.

Figure 9:
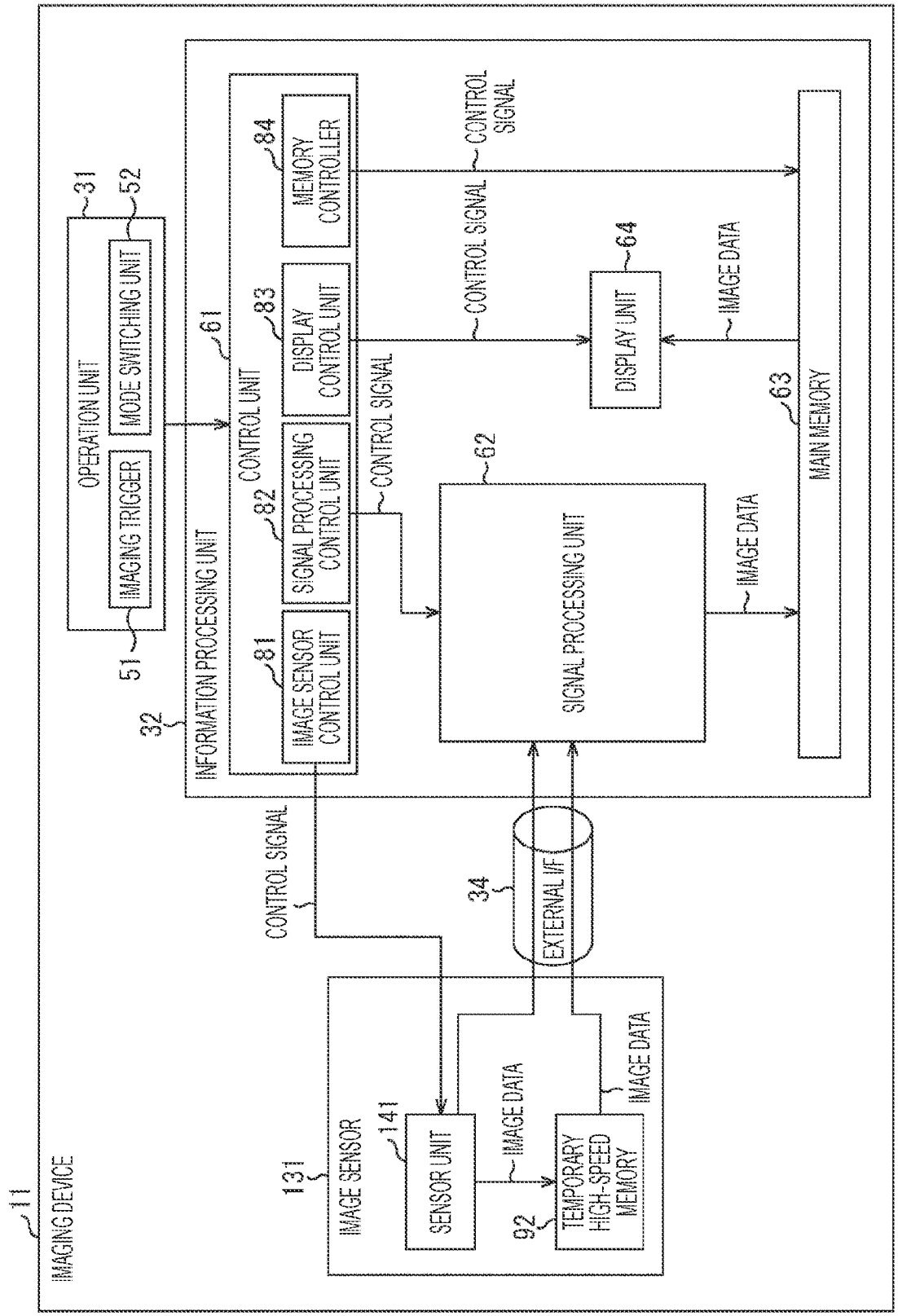
FIG. 9 is a block diagram for describing a configuration example of a second embodiment of an imaging device of the present disclosure.

Note that, in configurations of an imaging device 11 in FIG. 9, a configuration having the same function as the imaging device 11 in FIG. 2 is denoted with the same sign and description of the configuration is appropriately omitted.

That is, the imaging device 11 in FIG. 9 is different from the imaging device 11 in FIG. 2 in that an image sensor 131 is provided instead of the image sensor 33.

The function of the image sensor 131 is basically similar to that of the image sensor 33, but is different in generating and outputting image data of a low-resolution reduced image obtained by thinning out pixels together with image data of a high-definition image.

More specifically, the image sensor 131 includes a sensor unit 141 and a temporary high-speed memory 92.

The sensor unit 141 has a basic function similar to that of the sensor unit 91, but captures an image as a high-definition image, generates image data of the captured high-definition image, and transfers the image data to the temporary high-speed memory 92, and generates image data of a reduced image including an image obtained by reducing the resolution of the captured high-definition image, and outputs the image data to a signal processing unit 62 of an information processing unit 32 via an external I/F 34.

The signal processing unit 62 processes high-definition image data in a similar manner to the above-described processing, and further applies predetermined processing to image data of a reduced image and then transfers and stores the processed image data in a main memory 63.

A display control unit 83 controls a display unit 64 to read the image data of the reduced image stored in the main memory 63 and display the image data as a live view image.

Operation Example when Displaying Live View Image while Performing High-speed Continuous Imaging of Images with Same Exposure Time Next, an operation of when the temporary high-speed memory 92 corresponding to the imaging device 11 of FIG. 9 of the present disclosure displays a live view image while continuously capturing images with the same exposure time at high speed will be described with reference to a timing chart of FIG. 10.

Figure 10:
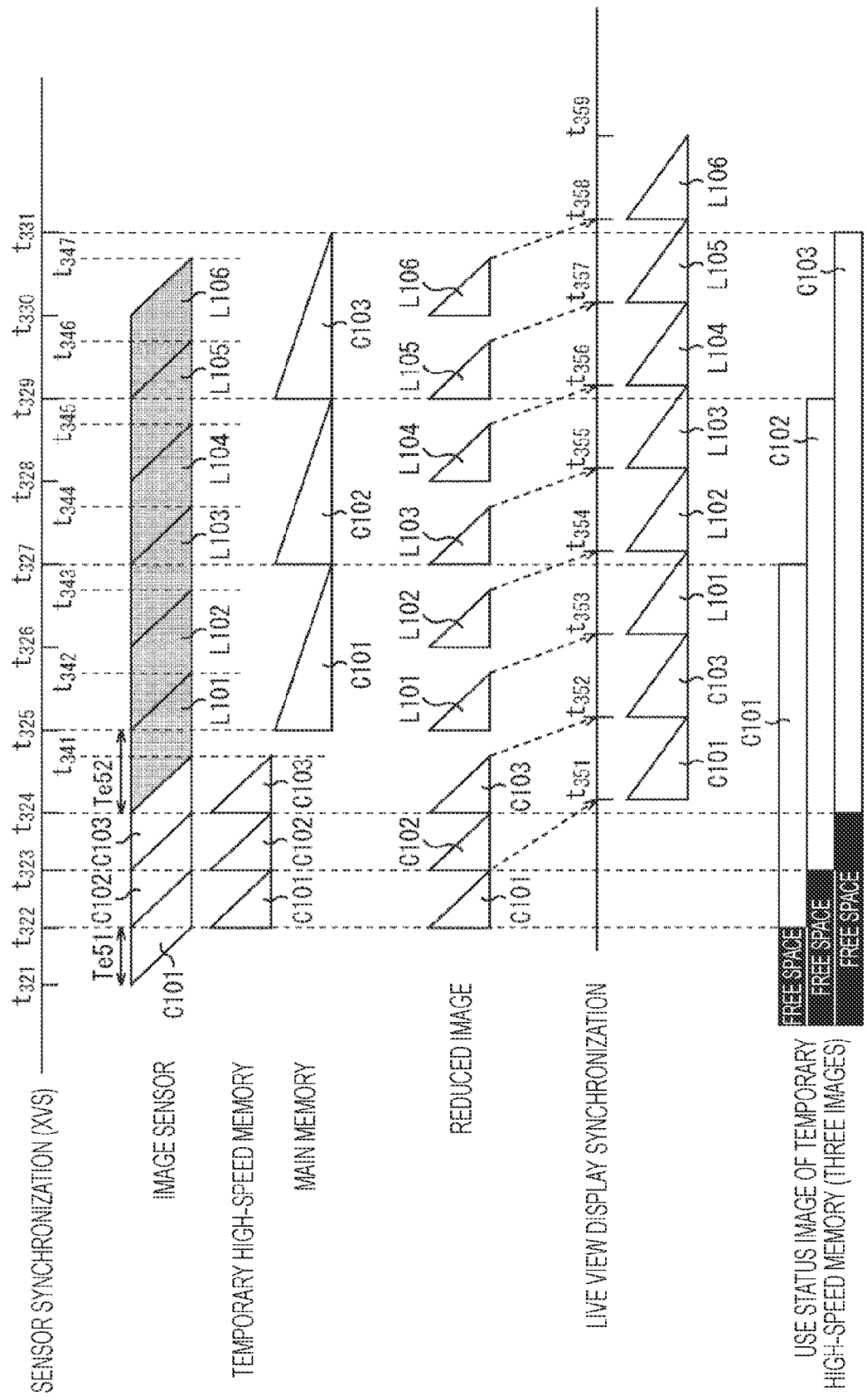
FIG. 10 is a timing chart for describing an operation example of displaying a live view image while implementing high-speed continuous imaging of continuously capturing images with the same exposure time.

Note that the timing chart of FIG. 10 is an operation example of when further displaying a live view image while performing the operation of continuously capturing images with the same exposure time at high speed as described with reference to the timing chart of FIG. 5.

Furthermore, FIG. 10 illustrates, from the top, sensor synchronization timing, timing of exposure and AD conversion of a high-definition image in the image sensor 131, operation timing in the temporary high-speed memory 92, operation timing of the main memory 63, timing of transfer of a reduced image, timing of display synchronization when displaying a live view image, and a use status image of three images in the temporary high-speed memory.

First, when the mode switching unit 52 of the operation unit 31 is operated to switch the operation mode to the high-speed continuous imaging and the imaging trigger 51 is operated to instruct the high-speed continuous imaging, the image sensor control unit 81 supplies the control signal for instructing the image sensor 131 to perform the continuous imaging at time t321 in the sensor synchronization signal.

In response to the signal, the sensor unit 141 performs exposure for an exposure time Te51, captures the image C101 including a high-definition image, and generates the image signal according to the amount of incident light, from time t321 to t322.

When the exposure ends at time t322, the sensor unit 141 performs AD conversion for the image signal of the image C101 and transfers the image signal as image data including a digital signal to the temporary high-speed memory 92 from time t322 to t323.

At the same time, from time t322 to t323, the temporary high-speed memory 92 stores the image data of one image C101 transferred from the sensor unit 141.

At this time, the sensor unit 141 performs AD conversion for the image signal of the low-resolution reduced image obtained by thinning the image C101, and transfers the image signal to the main memory 63 via the external I/F 34 and the signal processing unit 62 as image data of a reduced image including a digital signal.

Moreover, in parallel, the sensor unit 141 performs exposure for the exposure time Te51, captures the image C102 including a high-definition image, and generates the image signal according to the amount of incident light, from time t322 to t323.

When the exposure ends at time t323, the sensor unit 141 performs AD conversion for the image signal of the image C102 and transfers the image signal as image data including a digital signal to the temporary high-speed memory 92 from time t323 to t324.

At the same time, from time t323 to t324, the temporary high-speed memory 92 stores the image data of one image C102 transferred from the sensor unit 141.

At this time, the sensor unit 141 performs AD conversion for the image signal of the low-resolution reduced image obtained by thinning the image C102, and transfers the image signal to the main memory 63 via the external I/F 34 and the signal processing unit 62 as image data of a reduced image including a digital signal.

That is, at and after time t323, the image data of two images C101 and C102 are stored in the temporary high-speed memory 92.

Moreover, in parallel, the sensor unit 141 performs exposure for the exposure time Te51, captures the image C103 including a high-definition image, and generates the image signal according to the amount of incident light, from time t323 to t324.

When the exposure ends at time t324, the sensor unit 141 performs AD conversion for the image signal of the image C103 and transfers the image signal as image data including a digital signal to the temporary high-speed memory 92 from time t324 to t341.

At the same time, from time t324 to t341, the temporary high-speed memory 92 stores the image data of one image C103 transferred from the sensor unit 91.

At this time, the sensor unit 141 performs AD conversion for the image signal of the low-resolution reduced image obtained by thinning the image C103, and transfers the image signal to the main memory 63 via the external I/F 34 and the signal processing unit 62 as image data of a reduced image including a digital signal.

That is, at and after time t324, the image data of three images C101 to C103 are stored in the temporary high-speed memory 92.

Moreover, in parallel, the sensor unit 141 performs exposure for an exposure time Te52, captures the image L101 including a high-definition image, and generates the image signal according to the amount of incident light, from time t324 to t325.

When the exposure ends at time t325, the sensor unit 141 performs AD conversion for the image signal of the low-resolution reduced image obtained by thinning the image L101 including a high-definition image, and transfers the image signal as image data of a reduced image including a digital signal to the main memory 63 via the external I/F 34 and the signal processing unit 62, from time t325 to t342.

Furthermore, in parallel, the sensor unit 141 performs exposure for the exposure time Te52, captures the image L102 including a high-definition image, and generates the image signal according to the amount of incident light, from time t325 to t326.

When the exposure ends at time t326, the sensor unit 141 performs AD conversion for the image signal of the low-resolution reduced image obtained by thinning the image L102 including a high-definition image, and transfers the image signal as image data of a reduced image including a digital signal to the main memory 63 via the external I/F 34 and the signal processing unit 62, from time t326 to t343.

Moreover, from time t325 to t327, the temporary high-speed memory 92 transfers the image data of the image C101 including a high-definition image to the main memory 63 via the external I/F 34 and the signal processing unit 62 of the information processing unit 32.

Furthermore, in parallel, the sensor unit 141 performs exposure for the exposure time Te52, captures the image L103 including a high-definition image, and generates the image signal according to the amount of incident light, from time t326 to t327.

When the exposure ends at time t327, the sensor unit 141 performs AD conversion for the image signal of the low-resolution reduced image obtained by thinning the image L103 including a high-definition image, and transfers the image signal as image data of a reduced image including a digital signal to the main memory 63 via the external I/F 34 and the signal processing unit 62, from time t327 to t344.

Furthermore, in parallel, the sensor unit 141 performs exposure for the exposure time Te52, captures the image L104 including a high-definition image, and generates the image signal according to the amount of incident light, from time t327 to t328.

When the exposure ends at time t328, the sensor unit 141 performs AD conversion for the image signal of the low-resolution reduced image obtained by thinning the image L104 including a high-definition image, and transfers the image signal as image data of a reduced image including a digital signal to the main memory 63 via the external I/F 34 and the signal processing unit 62, from time t328 to t345.

Moreover, from time t327 to t329, the temporary high-speed memory 92 transfers the image data of the image C102 including a high-definition image to the main memory 63 via the external I/F 34 and the signal processing unit 62 of the information processing unit 32.

Furthermore, in parallel, the sensor unit 141 performs exposure for the exposure time Te52, captures the image L105 including a high-definition image, and generates the image signal according to the amount of incident light, from time t328 to t329.

When the exposure ends at time t329, the sensor unit 141 performs AD conversion for the image signal of the low-resolution reduced image obtained by thinning the image L105 including a high-definition image, and transfers the image signal as image data of a reduced image including a digital signal to the main memory 63 via the external I/F 34 and the signal processing unit 62, from time t329 to t346.

Furthermore, in parallel, the sensor unit 141 performs exposure for the exposure time Te52, captures the image L106 including a high-definition image, and generates the image signal according to the amount of incident light, from time t329 to t330.

When the exposure ends at time t330, the sensor unit 141 performs AD conversion for the image signal of the low-resolution reduced image obtained by thinning the image L106 including a high-definition image, and transfers the image signal as image data of a reduced image including a digital signal to the main memory 63 via the external I/F 34 and the signal processing unit 62, from time t330 to t347.

Moreover, from time t329 to t331, the temporary high-speed memory 92 transfers the image data of the image C103 including a high-definition image to the main memory 63 via the external I/F 34 and the signal processing unit 62 of the information processing unit 32.

By the processing so far, the image data of the high-definition images of the images C101 to C103 and the image data of the reduced images of the images C101 to C103 and the images L101 to L106 are transferred to the main memory 63.

In parallel with the above-described processing, the display control unit 83 controls the display unit 64 to sequentially read out the image data of the reduced images of the images C101 to C103 and the images L101 to L106 stored in the main memory 63, and causes the display unit 64 to display the image data as live view images.

Here, while the images C101 to C103 are continuously captured at high speed so as to minimize the imaging interval, the imaging intervals of the images L101 to L106 are adjusted to a frame rate when displayed as live view images.

Therefore, in this example, an exposure time Te52 of the images L101 to L106 is set longer than an exposure time Te51 of the images C101 to C103.

As a result, the image data of the reduced images of the images C101 to C103 has an imaging interval shorter than the image data of the reduced images of the images L101 to L106, and is in a state of being captured at a frame rate higher than the frame rate of the live view image.

Therefore, when causing the display unit 64 to display the image data of the reduced image as a live view image, the display control unit 83 thins out and displays the reduced image so as to conform to the frame rate of the live view image.

That is, in FIG. 10, when the display unit 64 displays the image data of the reduced image of the image C101 as a live view image, the display unit thins out the image data of the reduced image of the image C102 in accordance with the frame rate from time t351 to t352, and displays the image data of the reduced image of the image C103 as a live view image from time t352 to t353.

Hereinafter, since the image data of the reduced image is generated in accordance with the frame rate of a live view image, the image data of the reduced image of the image L101 is displayed as a live view image from time t353 to t354, and thereafter, similarly, the image data of the reduced images of the images L102 to L106 are displayed as live view images from time t354 to t359. Note that the relationship in length with respect to the exposure times Te51 and Te52 is not limited to this example, and the lengths may be the same or opposite.

By the above processing, for the image data of the number recordable in the temporary high-speed memory 92, it is possible to display a live view image while implementing the imaging of shortening the imaging interval until the imaging interval becomes substantially 0.

As a result, since it is possible to always perform framing while viewing the live view image at the time of imaging, it is possible to capture a high-speed object and facilitate imaging.

Operation Example when Displaying Live View Image while Performing High-speed Continuous Imaging of Images with Different Exposure Times In the above description, an example in which the exposure times are unified for a plurality of pieces of image data has been described, but the exposure times may be varied.

Figure 11:
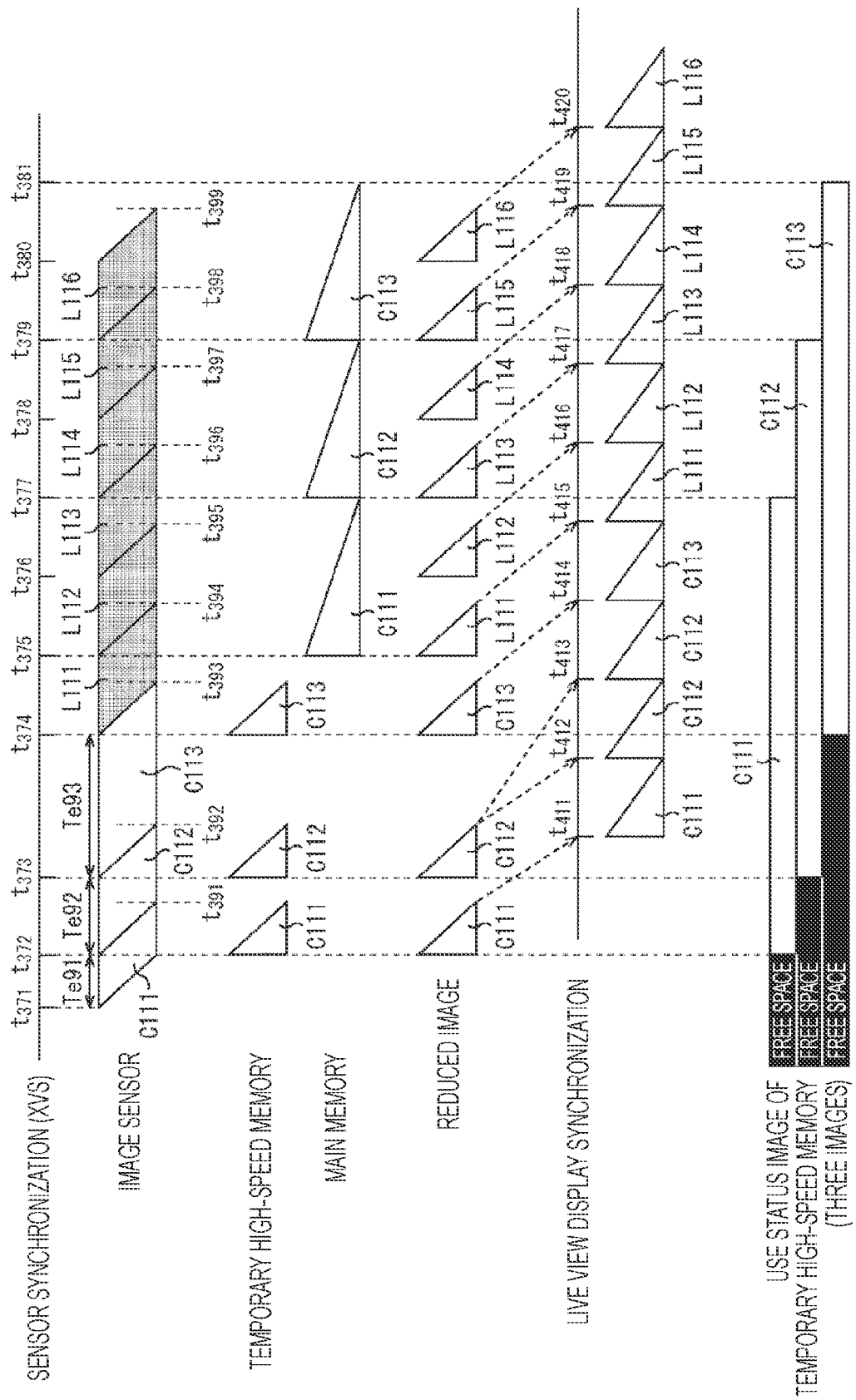
FIG. 11 is a timing chart for describing an operation example of displaying a live view image while implementing high-speed continuous imaging of continuously capturing images with different exposure times.

That is, as illustrated in FIG. 11, an exposure time Te91 may be set in the image C111, an exposure time Te92 (>Te91) may be set in the image C112, and an exposure time Te93 (>Te92) may be set in the image C113.

Note that, in the case of FIG. 11, since the exposure times Te92 to Te93 are at a rate lower than the frame rate of the live view image, the display unit 64 displays the image data of the reduced image of the image C111 as the live view image from time t411 to t412.

However, the display unit 64 displays the image data of the reduced image of the image C112 as a live view image from time t412 to t413, and displays the image data of the reduced image of the image C112 that is the same as the image at the immediately preceding timing as a live view image from time t413 to t414.

Then, the display unit 64 displays the image data of the reduced images of the image C113 as a live view image from time t413 to t414, and sequentially displays the image data of the reduced images of the images L111 to L116 as live view images at or after time t414 until time t420.

That is, in the high-speed continuous imaging, the exposure times of the continuously captured images may be the same or different from each other.

Furthermore, even if the imaging interval of the continuously captured images changes due to the difference in the exposure time, the live view image can be appropriately displayed by thinning out or repeatedly displaying the image data of the reduced image in accordance with the frame rate of the live view image for the live view image based on the generated reduced image.

Note that the images C111 to C113 and the images L111 to L116 in FIG. 11 are images corresponding to the images C101 to C103 and the images L101 to L106 in FIG. 10, but the exposure times are different from each other in the images C111 to C113 in FIG. 11.

Furthermore, the processing at the timing from time t371 to t381 and time t411 to t419 in FIG. 11 corresponds to the processing at the timing from time t321 to t331 and time t351 to t359 in FIG. 10, respectively.

However, from the relationship between the imaging interval and the frame rate of the live view image, in FIG. 10, the image data of the reduced image corresponding to the image C102 is thinned out and the live view image is displayed, and in FIG. 11, the image C112 is continuously and repeatedly displayed as the live view image.

Example of Displaying Live View Image while Configuring Ring Buffer by Temporary High-speed Memory and Implementing High-speed Continuous Imaging The live view image may be displayed while configuring a ring buffer by the temporary high-speed memory and implementing the high-speed continuous imaging.

Here, an operation example of a case of displaying a live view image while implementing high-speed continuous imaging by configuring a ring buffer by the temporary high-speed memory 92 will be described with reference to a timing chart of FIG. 12. Note that, in FIG. 12, in addition to the display in FIGS. 10 and 11, timing (trigger) at which the high-speed continuous imaging is instructed and timing of software processing are illustrated in the second lowest and the lowest.

That is, when the mode switching unit 52 of the operation unit 31 is operated to switch the operation mode to the high-speed continuous imaging and the imaging trigger 51 is operated to instruct the high-speed continuous imaging, the software processing of the control unit 61 of the information processing unit 32 is started at time t421 in the sensor synchronization signal, and the image sensor control unit 81 supplies the control signal for instructing the image sensor 131 to perform the high-speed continuous imaging at time t422.

In response to the signal, the sensor unit 141 performs exposure for an exposure time Te101, captures the image C201, and generates the image signal of a high-definition image according to the amount of incident light, from time t422 to t423.

When the exposure ends at time t423, the sensor unit 91 performs AD conversion for the image signal of the image C201 including a high-definition image, and transfers the converted image signal as image data of a high-definition image including a digital signal to the temporary high-speed memory 92, from time t423 to t424.

At the same time, from time t423 to t424, the temporary high-speed memory 92 stores the image data of one image C201 including a high-definition image transferred from the sensor unit 91.

At this time, the sensor unit 141 performs AD conversion for the image signal of the low-resolution reduced image obtained by thinning the image C201 that is a high-definition image, and transfers the image signal to the main memory 63 via the external I/F 34 and the signal processing unit 62 as image data of a reduced image including a digital signal.

Moreover, in parallel, the sensor unit 141 performs exposure for an exposure time Te101, captures the image C202, and generates the image signal according to the amount of incident light, from time t423 to t424.

When the exposure ends at time t424, the sensor unit 141 performs AD conversion for the image signal of the image C202 including a high-definition image, and transfers the converted image signal as image data of a high-definition image including a digital signal to the temporary high-speed memory 92, from time t424 to t425.

At the same time, from time t424 to t425, the temporary high-speed memory 92 stores the image data of one image C202 including a high-definition image transferred from the sensor unit 91.

At this time, the sensor unit 141 performs AD conversion for the image signal of the low-resolution reduced image obtained by thinning the image C202 including a high-definition image, and transfers the image signal to the main memory 63 via the external I/F 34 and the signal processing unit 62 as image data of a reduced image including a digital signal.

That is, at and after time t424, the image data of two images C201 and C202 including high-definition images are stored in the temporary high-speed memory 92.

Moreover, in parallel, the sensor unit 141 performs exposure for the exposure time Te101, captures the image C203 including a high-definition image, and generates the image signal according to the amount of incident light, from time t424 to t425.

When the exposure ends at time t425, the sensor unit 141 performs AD conversion for the image signal of the image C203 including a high-definition image and transfers the converted image signal as image data including a digital signal to the temporary high-speed memory 92 from time t425 to t426.

At the same time, from time t425 to t426, the temporary high-speed memory 92 stores the image data of one image C203 including a high-definition image transferred from the sensor unit 141.

At this time, the sensor unit 141 performs AD conversion for the image signal of the low-resolution reduced image obtained by thinning the image C203 including a high-definition image, and transfers the image signal to the main memory 63 via the external I/F 34 and the signal processing unit 62 as image data of a reduced image including a digital signal.

That is, at and after time t425, the image data of three images C201 to C203 including high-definition images are stored in the temporary high-speed memory 92.

Moreover, in parallel, the sensor unit 141 performs exposure for the exposure time Te101, captures the image C204 including a high-definition image, and generates the image signal according to the amount of incident light, from time t425 to t426.

When the exposure ends at time t426, the sensor unit 141 performs AD conversion for the image signal of the image C204 including a high-definition image and transfers the converted image signal as image data including a digital signal to the temporary high-speed memory 92 from time t426 to t427.

At the same time, from time t426 to t427, when acquiring the image data of one image C204 including a high-definition image transferred from the sensor unit 141, the temporary high-speed memory 92 overwrites the image data of the image C201, which is the oldest image data, with the image data of the image C204 and stores the image data because the temporary high-speed memory has already stored three images of image data.

That is, at and after time t426, the image data of three images C202 to C204 are stored in the temporary high-speed memory 92.

At this time, the sensor unit 141 performs AD conversion for the image signal of the low-resolution reduced image obtained by thinning the image C204 including a high-definition image, and transfers the image signal to the main memory 63 via the external I/F 34 and the signal processing unit 62 as image data of a reduced image including a digital signal.

Moreover, in parallel, the sensor unit 141 performs exposure for the exposure time Te101, captures the image C205 including a high-definition image, and generates the image signal according to the amount of incident light, from time t426 to t427.

When the exposure ends at time t427, the sensor unit 141 performs AD conversion for the image signal of the image C205 including a high-definition image and transfers the converted image signal as image data including a digital signal to the temporary high-speed memory 92 from time t427 to t428.

At the same time, from time t427 to t428, when acquiring the image data of one image C205 including a high-definition image transferred from the sensor unit 91, the temporary high-speed memory 92 overwrites the image data of the image C202, which is the oldest image data, with the image data of the image C205 and stores the image data because the temporary high-speed memory has already stored three images of image data.

That is, at and after time t427, the image data of three images C203 to C205 are stored in the temporary high-speed memory 92.

At this time, the sensor unit 141 performs AD conversion for the image signal of the low-resolution reduced image obtained by thinning the image C205 including a high-definition image, and transfers the image signal to the main memory 63 via the external I/F 34 and the signal processing unit 62 as image data of a reduced image including a digital signal.

Moreover, in parallel, the sensor unit 91 performs exposure for the exposure time Te101, captures the image C206 including a high-definition image, and generates the image signal according to the amount of incident light, from time t427 to t428.

Here, at time t451, it is assumed that the operation of the imaging trigger 51 is canceled, and the instruction of the high-speed continuous imaging is stopped.

In response to this instruction, at time t452, the image sensor control unit 81 of the control unit 61 instructs the image sensor 33 to stop the high-speed continuous imaging of the currently exposed image C206 and subsequent images by software processing.

When the exposure ends at time t428, the sensor unit 141 performs AD conversion for the image signal of the image C206 and transfers the image signal as image data including a digital signal to the temporary high-speed memory 92 from time t428 to t453.

At the same time, from time t428 to t453, when acquiring the image data of one image C206 including a high-definition image transferred from the sensor unit 91, the temporary high-speed memory 92 overwrites the image data of the image C203, which is the oldest image data, with the image data of the image C206 and stores the image data because the temporary high-speed memory has already stored three images of image data.

That is, at and after time t428, the image data of three images C204 to C206 are stored in the temporary high-speed memory 92.

At this time, the sensor unit 141 performs AD conversion for the image signal of the low-resolution reduced image obtained by thinning the image C206 including a high-definition image, and transfers the image signal to the main memory 63 via the external I/F 34 and the signal processing unit 62 as image data of a reduced image including a digital signal.

Furthermore, the sensor unit 141 does not perform the high-speed continuous imaging at and after time t428 in response to the instruction to stop the high-speed continuous imaging at time t452. Note that the imaging of the live view image is continued.

Moreover, the sensor unit 141 performs exposure for an exposure time Te102 (>Te101), captures the image L201 including a high-definition image, and generates the image signal according to the amount of incident light, from time t428 to t429.

When the exposure ends at time t429, the sensor unit 141 performs AD conversion for the image signal of the low-resolution reduced image obtained by thinning the image L201 including a high-definition image, and transfers the image signal as image data of a reduced image including a digital signal to the main memory 63 via the external I/F 34 and the signal processing unit 62, from time t429 to t454.

Moreover, the sensor unit 141 performs exposure for the exposure time Te102 (>Te101), captures the image L202 including a high-definition image, and generates the image signal according to the amount of incident light, from time t429 to t430.

When the exposure ends at time t430, the sensor unit 141 performs AD conversion for the image signal of the low-resolution reduced image obtained by thinning the image L202 including a high-definition image, and transfers the image signal as image data of a reduced image including a digital signal to the main memory 63 via the external I/F 34 and the signal processing unit 62, from time t430 to t455.

Furthermore, from time t429 to t431, the temporary high-speed memory 92 transfers the stored image data of the image C204, which is the oldest image data, to the main memory 63 via the external I/F 34 and the signal processing unit 62 of the information processing unit 32 in response to the instruction to stop the continuous imaging at time t452.

Moreover, the sensor unit 141 performs exposure for the exposure time Te102 (>Te101), captures the image L203 including a high-definition image, and generates the image signal according to the amount of incident light, from time t430 to t431.

When the exposure ends at time t431, the sensor unit 141 performs AD conversion for the image signal of the low-resolution reduced image obtained by thinning the image L203 including a high-definition image, and transfers the image signal as image data of a reduced image including a digital signal to the main memory 63 via the external I/F 34 and the signal processing unit 62, from time t431 to t456.

Moreover, the sensor unit 141 performs exposure for the exposure time Te102 (>Te101), captures the image L204 including a high-definition image, and generates the image signal according to the amount of incident light, from time t431 to t432.

When the exposure ends at time t432, the sensor unit 141 performs AD conversion for the image signal of the low-resolution reduced image obtained by thinning the image L204 including a high-definition image, and transfers the image signal as image data of a reduced image including a digital signal to the main memory 63 via the external I/F 34 and the signal processing unit 62, from time t432 to t457.

Furthermore, from time t431 to t433, the temporary high-speed memory 92 transfers the stored image data of the image C205, which is the oldest image data, to the main memory 63 via the external I/F 34 and the signal processing unit 62 of the information processing unit 32.

Moreover, the sensor unit 141 performs exposure for the exposure time Te102 (>Te101), captures the image L205 including a high-definition image, and generates the image signal according to the amount of incident light, from time t432 to t433.

When the exposure ends at time t433, the sensor unit 141 performs AD conversion for the image signal of the low-resolution reduced image obtained by thinning the image L205 including a high-definition image, and transfers the image signal as image data of a reduced image including a digital signal to the main memory 63 via the external I/F 34 and the signal processing unit 62, from time t433 to t458.

Moreover, the sensor unit 141 performs exposure for the exposure time Te102 (>Te101), captures the image L206 including a high-definition image, and generates the image signal according to the amount of incident light, from time t433 to t434.

When the exposure ends at time t434, the sensor unit 141 performs AD conversion for the image signal of the low-resolution reduced image obtained by thinning the image L206 including a high-definition image, and transfers the image signal as image data of a reduced image including a digital signal to the main memory 63 via the external I/F 34 and the signal processing unit 62, from time t434 to t459.

Furthermore, from time t433 to t435, the temporary high-speed memory 92 transfers the stored image data of the image C206, which is the oldest image data, to the main memory 63 via the external I/F 34 and the signal processing unit 62 of the information processing unit 32.

By the processing so far, the image data of the high-definition images of the images C204 to C206 and the image data of the reduced images of the images C201 to C206 and the images L201 to L206 are transferred to the main memory 63.

In parallel with the above-described processing, the display control unit 83 controls the display unit 64 to sequentially read out the image data of the reduced images of the images C201 to C206 and the images L201 to L206 stored in the main memory 63, and causes the display unit 64 to display the image data as live view images.

Here, while the images C201 to C206 are continuously captured at high speed so as to minimize the imaging interval, the imaging intervals of the images L201 to L206 are adjusted to a frame rate when displayed as live view images.

Therefore, in this example, an exposure time Te102 (>Te101) of the images L201 to L206 is set longer than the exposure time Te101 of the images C201 to C206.

As a result, the image data of the reduced images of the images C201 to C206 has an imaging interval shorter than the image data of the reduced images of the images L201 to L206, and is in a state of being captured at a frame rate higher than the frame rate of the live view image.

Therefore, when causing the display unit 64 to display the image data of the reduced image as a live view image, the display control unit 83 thins out and displays the reduced image so as to conform to the frame rate of the live view image.

Figure 12:
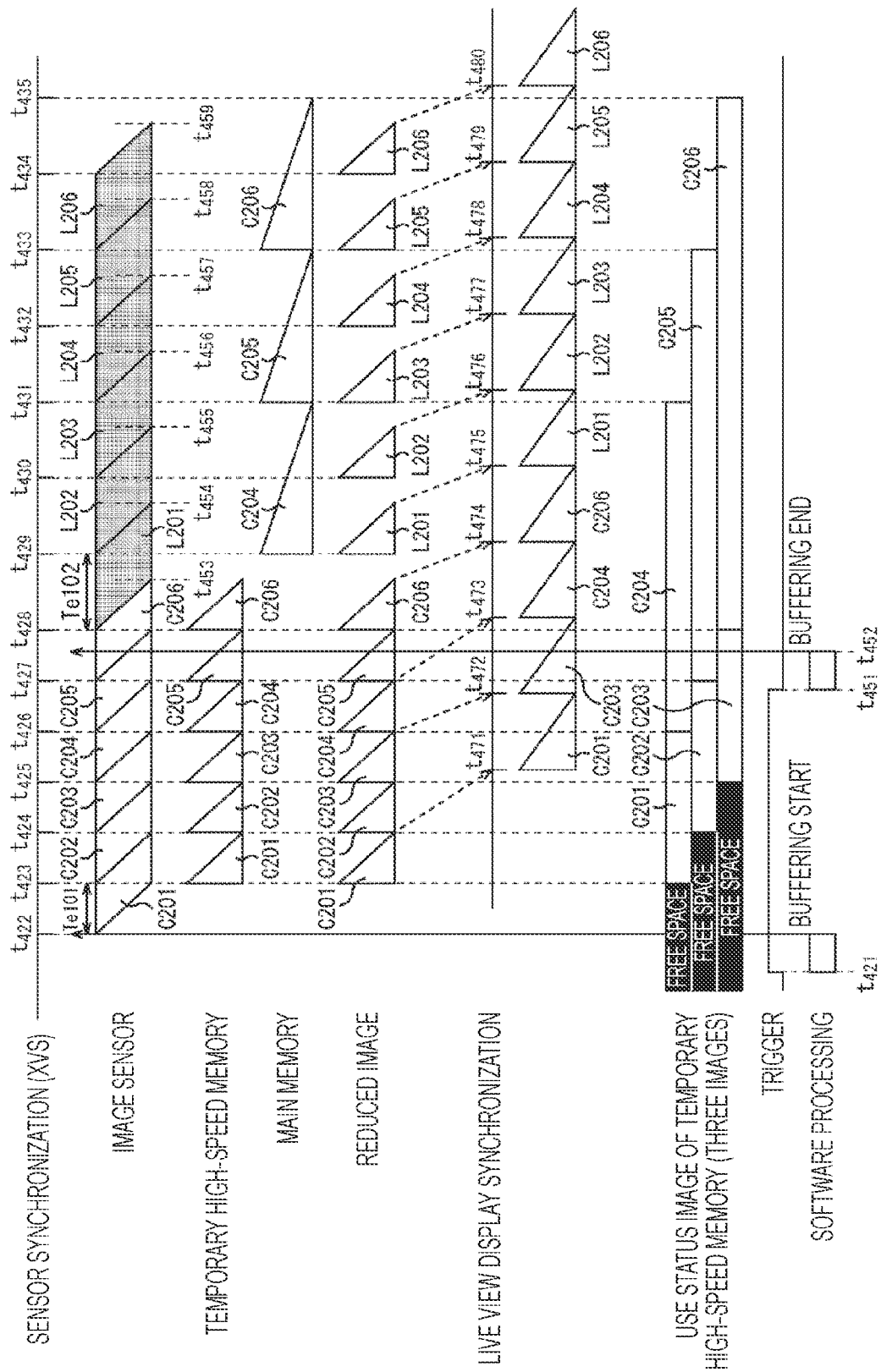
FIG. 12 is a timing chart for describing an operation example of displaying a live view image while implementing high-speed continuous imaging when configuring a ring buffer.

That is, in FIG. 12, when the display unit 64 displays the image data of the reduced image of the image C201 as a live view image, the display unit thins out the image data of the reduced image of the image C202 in accordance with the frame rate from time t471 to t472, and displays the image data of the reduced image of the image C203 as a live view image from time t472 to t473.

Furthermore, when the display unit 64 displays the image data of the reduced image of the image C204 as a live view image, the display unit thins out the image data of the reduced image of the image C205 in accordance with the frame rate from time t473 to t474, and displays the image data of the reduced image of the image C206 as a live view image from time t474 to t475.

Hereinafter, since the image data of the reduced image is generated in accordance with the frame rate of a live view image, the image data of the reduced image of the image L201 is displayed as a live view image from time t475 to t476, and thereafter, similarly, the image data of the reduced images of the images L202 to L206 are displayed as live view images from time t476 to t480.

By the above processing, for the number of image data recordable in the temporary high-speed memory 92, it is possible to display a live view image while implementing imaging of substantially shortening the imaging interval to 0, for the plurality of most recent images storable in the temporary high-speed memory 92, as long as the high-speed continuous imaging is performed, by configuring the ring buffer.

Example of Displaying Live View Image while Switching Normal Continuous Imaging and High-speed Continuous Imaging An example of displaying the live view image while causing the temporary high-speed memory 92 to function as a ring buffer has been described above. However, the live view image may be displayed while switching the normal continuous imaging and the high-speed continuous imaging.

Figure 13:
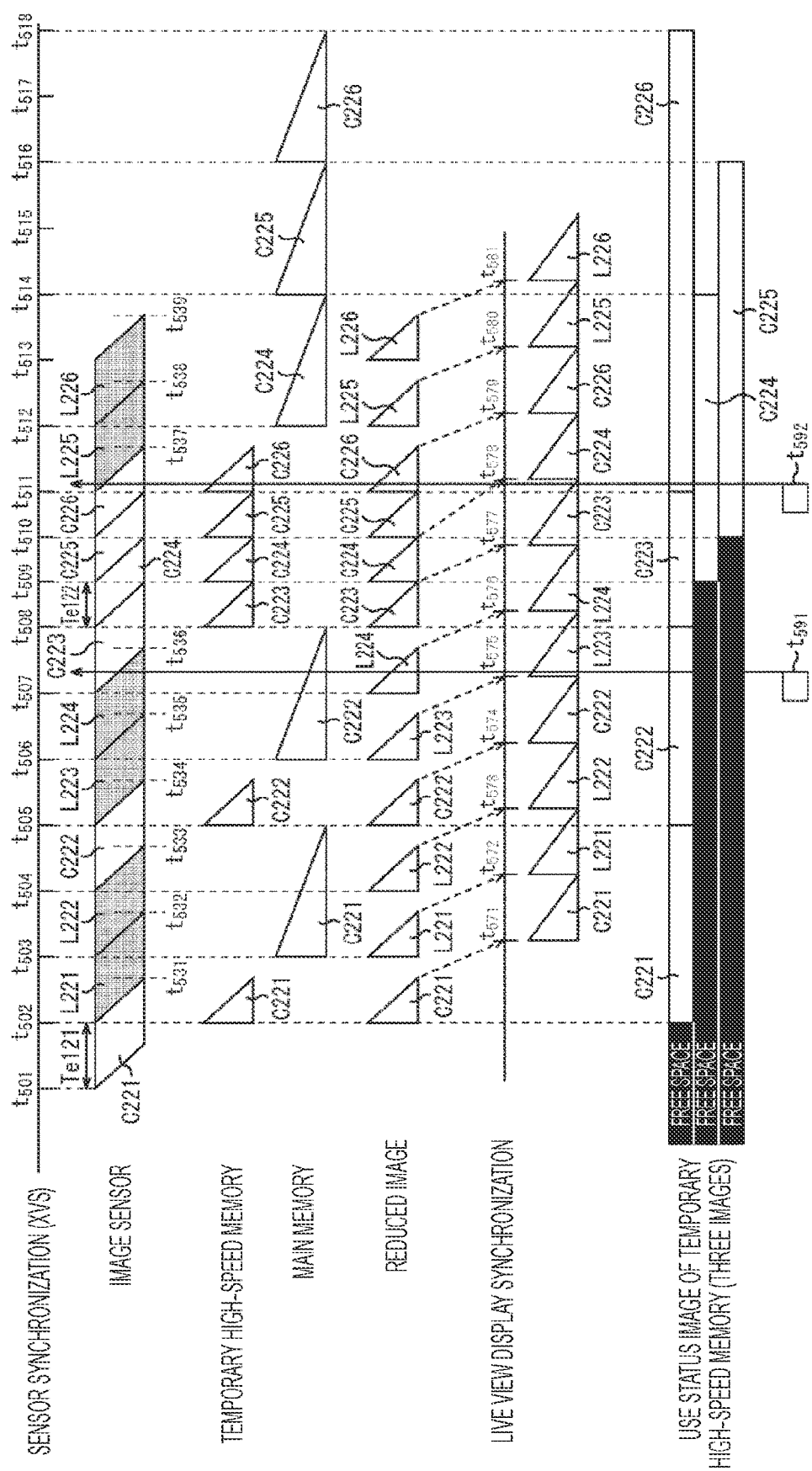
FIG. 13 is a timing chart for describing an operation example of displaying a live view image while switching the normal continuous imaging and the high-speed continuous imaging.

Here, an operation example of a case of displaying a live view image while switching normal continuous imaging and high-speed continuous imaging will be described with reference to a timing chart of FIG. 13.

First, when the mode switching unit 52 of the operation unit 31 is operated to switch the operation mode to the normal continuous imaging and the imaging trigger 51 is operated to instruct the normal continuous imaging, the image sensor control unit 81 supplies the control signal for instructing the image sensor 33 to perform the normal continuous imaging at time t501 in the sensor synchronization signal.

In response to the signal, the sensor unit 141 performs exposure for an exposure time Te121, captures the image C221, and generates the image signal according to the amount of incident light, from time t501 to t502.

When the exposure ends at time t502, the sensor unit 141 performs AD conversion for the image signal of the image C221 and transfers the image signal as image data including a digital signal to the temporary high-speed memory 92 from time t502 to t531.

At the same time, from time t502 to t531, the temporary high-speed memory 92 stores the image data of one image C221 transferred from the sensor unit 91.

At this time, the sensor unit 141 performs AD conversion for the image signal of the low-resolution reduced image obtained by thinning the image C221, and transfers the image signal to the main memory 63 via the external I/F 34 and the signal processing unit 62 as image data of a reduced image including a digital signal.

Furthermore, the sensor unit 141 performs exposure for the exposure time Te121, captures the image L221 including a high-definition image, and generates the image signal according to the amount of incident light, from time t502 to t503.

When the exposure ends at time t503, the sensor unit 141 performs AD conversion for the image signal of the low-resolution reduced image obtained by thinning the image L221 including a high-definition image, and transfers the image signal as image data of a reduced image including a digital signal to the main memory 63 via the external I/F 34 and the signal processing unit 62, from time t503 to t532.

Moreover, the sensor unit 141 performs exposure for the exposure time Te121, captures the image L222 including a high-definition image, and generates the image signal according to the amount of incident light, from time t503 to t504.

When the exposure ends at time t504, the sensor unit 141 performs AD conversion for the image signal of the low-resolution reduced image obtained by thinning the image L222 including a high-definition image, and transfers the image signal as image data of a reduced image including a digital signal to the main memory 63 via the external I/F 34 and the signal processing unit 62, from time t504 to t533.

Furthermore, during this period, from time t503 to t505, the temporary high-speed memory 92 transfers the image data of the image C221 including a high-definition image to the main memory 63 via the external I/F 34 and the signal processing unit 62 of the information processing unit 32.

During the processing of transferring the image data of the image C221 from the temporary high-speed memory 92 to the main memory 63, the sensor unit 141 performs exposure for the exposure time Te121, captures the image C222 including the high-definition image, and generates the image signal according to the amount of incident light, from time t504 to t505.

When the exposure ends at time t505, the sensor unit 141 performs AD conversion for the image signal of the image C222 including a high-definition image and transfers the converted image signal as image data including a digital signal to the temporary high-speed memory 92 from time t505 to t534.

At the same time, from time t505 to t534, the temporary high-speed memory 92 stores the image data of one image C222 including a high-definition image transferred from the sensor unit 91.

Furthermore, the sensor unit 141 performs exposure for the exposure time Te121, captures the image L221 including a high-definition image, and generates the image signal according to the amount of incident light, from time t504 to t503.

When the exposure ends at time t503, the sensor unit 141 performs AD conversion for the image signal of the low-resolution reduced image obtained by thinning the image L221 including a high-definition image, and transfers the image signal as image data of a reduced image including a digital signal to the main memory 63 via the external I/F 34 and the signal processing unit 62, from time t503 to t532.

Moreover, the sensor unit 141 performs exposure for the exposure time Te121, captures the image L222 including a high-definition image, and generates the image signal according to the amount of incident light, from time t503 to t504.

When the exposure ends at time t504, the sensor unit 141 performs AD conversion for the image signal of the low-resolution reduced image obtained by thinning the image L222 including a high-definition image, and transfers the image signal as image data of a reduced image including a digital signal to the main memory 63 via the external I/F 34 and the signal processing unit 62, from time t504 to t533.

Furthermore, during this period, from time t503 to t505, the temporary high-speed memory 92 transfers the image data of the image C221 including a high-definition image to the main memory 63 via the external I/F 34 and the signal processing unit 62 of the information processing unit 32.

During the processing of transferring the image data of the image C221 including the high-definition image from the temporary high-speed memory 92 to the main memory 63, the sensor unit 141 performs exposure for the exposure time Te121, captures the image C222 including the high-definition image, and generates the image signal according to the amount of incident light, from time t504 to t505.

When the exposure ends at time t505, the sensor unit 141 performs AD conversion for the image signal of the image C222 including a high-definition image and transfers the converted image signal as image data including a digital signal to the temporary high-speed memory 92 from time t505 to t534.

At the same time, from time t505 to t534, the temporary high-speed memory 92 stores the image data of one image C222 including a high-definition image transferred from the sensor unit 91 by overwriting the image data of the image C221.

At this time, the sensor unit 141 performs AD conversion for the image signal of a low-resolution reduced image obtained by thinning the image C222, and transfers the image signal to the main memory 63 via the external I/F 34 and the signal processing unit 62 as image data of a reduced image including a digital signal.

Furthermore, the sensor unit 141 performs exposure for the exposure time Te121, captures the image L223 including a high-definition image, and generates the image signal according to the amount of incident light, from time t505 to t506.

When the exposure ends at time t506, the sensor unit 141 performs AD conversion for the image signal of the low-resolution reduced image obtained by thinning the image L223 including a high-definition image, and transfers the image signal as image data of a reduced image including a digital signal to the main memory 63 via the external I/F 34 and the signal processing unit 62, from time t506 to t535.

Moreover, the sensor unit 141 performs exposure for the exposure time Te121, captures the image L224 including a high-definition image, and generates the image signal according to the amount of incident light, from time t506 to t507.

When the exposure ends at time t507, the sensor unit 141 performs AD conversion for the image signal of the low-resolution reduced image obtained by thinning the image L224 including a high-definition image, and transfers the image signal as image data of a reduced image including a digital signal to the main memory 63 via the external I/F 34 and the signal processing unit 62, from time t507 to t536.

Furthermore, during this period, from time t506 to t508, the temporary high-speed memory 92 transfers the image data of the image C222 to the main memory 63 via the external I/F 34 and the signal processing unit 62 of the information processing unit 32.

During the processing of transferring the image data of the image C222 from the temporary high-speed memory 92 to the main memory 63, the sensor unit 141 performs exposure for the exposure time Te121, captures the image C223 including the high-definition image, and generates the image signal according to the amount of incident light, from time t507 to t508.

Here, at time t591, it is assumed that, when the mode switching unit 52 is operated and the operation mode is switched to the high-speed continuous imaging, the high-speed continuous imaging is instructed by operating the imaging trigger 51.

The image sensor control unit 81 instructs the image sensor 131 to perform the high-speed continuous imaging. As a result, after completion of the imaging of the image C223 including a high-definition image and the transfer to the temporary high-speed memory 92, the image sensor 131 performs the high-speed continuous imaging using the temporary high-speed memory 92 as a ring buffer.

When the exposure ends at time t508, the sensor unit 141 performs AD conversion for the image signal of the image C223 including a high-definition image and transfers the converted image signal as image data including a digital signal to the temporary high-speed memory 92 from time t508 to t509.

At the same time, from time t508 to t509, the temporary high-speed memory 92 stores the image data of one image C223 including a high-definition image transferred from the sensor unit 141 by overwriting the image data of the image C222.

Moreover, the sensor unit 141 performs exposure for an exposure time Te122 (<Te121), captures the image C224 including a high-definition image, and generates the image signal according to the amount of incident light, from time t508 to t509.

When the exposure ends at time t509, the sensor unit 141 performs AD conversion for the image signal of the image C224 including a high-definition image and transfers the converted image signal as image data including a digital signal to the temporary high-speed memory 92 from time t509 to t510.

At the same time, from time t509 to t510, when acquiring the image data of one image C224 including a high-definition image transferred from the sensor unit 91, the temporary high-speed memory 92 stores the image data of the image C224.

That is, at or after time t509, the temporary high-speed memory 92 stores the image data of the two images C223 and C224.

Furthermore, at this time, the sensor unit 141 performs AD conversion for the image signal of the low-resolution reduced image obtained by thinning the image C224 including a high-definition image, and transfers the image signal to the main memory 63 via the external I/F 34 and the signal processing unit 62 as image data of a reduced image including a digital signal.

Moreover, in parallel, the sensor unit 141 performs exposure for the exposure time Te122, captures the image C225 including a high-definition image, and generates the image signal according to the amount of incident light, from time t509 to t510.

When the exposure ends at time t510, the sensor unit 141 performs AD conversion for the image signal of the image C225 including a high-definition image and transfers the converted image signal as image data including a digital signal to the temporary high-speed memory 92 from time t510 to t511.

At the same time, from time t510 to t511, when acquiring the image data of one image C225 including a high-definition image transferred from the sensor unit 141, the temporary high-speed memory 92 stores the image data of the image C225.

That is, at or after time t510, the temporary high-speed memory 92 stores the image data of the three images C223 to C225.

Furthermore, at this time, the sensor unit 141 performs AD conversion for the image signal of the low-resolution reduced image obtained by thinning the image C225 including a high-definition image, and transfers the image signal to the main memory 63 via the external I/F 34 and the signal processing unit 62 as image data of a reduced image including a digital signal.

Moreover, in parallel, the sensor unit 141 performs exposure for the exposure time Te122, captures the image C226 including a high-definition image, and generates the image signal according to the amount of incident light, from time t510 to t511.

When the exposure ends at time t511, the sensor unit 141 performs AD conversion for the image signal of the image C226 including a high-definition image and transfers the converted image signal as image data including a digital signal to the temporary high-speed memory 92 from time t511 to t537.

At the same time, from time t511 to t537, when acquiring the image data of one image C226 including a high-definition image transferred from the sensor unit 141, the temporary high-speed memory 92 overwrites the image data of the image C223, which is the oldest image data, with the image data of the image C226 and stores the image data because the temporary high-speed memory has already stored three images of image data.

That is, at and after time t511, the image data of three images C224 to C226 are stored in the temporary high-speed memory 92.

Furthermore, at this time, the sensor unit 141 performs AD conversion for the image signal of the low-resolution reduced image obtained by thinning the image C226 including a high-definition image, and transfers the image signal to the main memory 63 via the external I/F 34 and the signal processing unit 62 as image data of a reduced image including a digital signal.

Here, at time t592, it is assumed that the operation of the imaging trigger 51 is canceled, and all the instructions of the single imaging, the normal continuous imaging, and the high-speed continuous imaging are stopped.

In response to this instruction, at time t592, the image sensor control unit 81 of the control unit 61 instructs the image sensor 33 to stop the high-speed continuous imaging of the currently exposed image C226 and subsequent images by software processing. Note that what is stopped is the high-speed continuous imaging, and imaging of an image for displaying a live view image is continued.

That is, the sensor unit 141 performs exposure for the exposure time Te121, captures the image L225 including a high-definition image, and generates the image signal according to the amount of incident light, from time t511 to t512.

When the exposure ends at time t512, the sensor unit 141 performs AD conversion for the image signal of the low-resolution reduced image obtained by thinning the image L225 including a high-definition image, and transfers the image signal as image data of a reduced image including a digital signal to the main memory 63 via the external I/F 34 and the signal processing unit 62, from time t512 to t538.

Moreover, the sensor unit 141 performs exposure for the exposure time Te121, captures the image L226 including a high-definition image, and generates the image signal according to the amount of incident light, from time t512 to t513.

When the exposure ends at time t513, the sensor unit 141 performs AD conversion for the image signal of the low-resolution reduced image obtained by thinning the image L226 including a high-definition image, and transfers the image signal as image data of a reduced image including a digital signal to the main memory 63 via the external I/F 34 and the signal processing unit 62, from time t513 to t539.

Moreover, from time t512 to t514, the temporary high-speed memory 92 transfers the stored image data of the image C224, which is the oldest image data, to the main memory 63 via the external I/F 34 and the signal processing unit 62 of the information processing unit 32 in response to the instruction to stop the continuous imaging at time t592.

Next, from time t514 to t516, the temporary high-speed memory 92 transfers the stored image data of the image C225, which is the oldest image data, to the main memory 63 via the external I/F 34 and the signal processing unit 62 of the information processing unit 32.

Moreover, from time t516 to t518, the temporary high-speed memory 92 transfers the stored image data of the image C226 to the main memory 63 via the external I/F 34 and the signal processing unit 62 of the information processing unit 32.

By the processing so far, the image data of the high-definition images of the images C224 to C226 and the image data of the reduced images of the images C221 to C226 and the images L221 to L226 are transferred to the main memory 63.

In parallel with the above-described processing, the display control unit 83 controls the display unit 64 to sequentially read out the image data of the reduced images of the images C221 to C226 and the images L221 to L226 stored in the main memory 63, and causes the display unit 64 to display the image data as live view images.

Here, while the images C224 to C226 are continuously captured at high speed so as to minimize the image capture interval, the image capture intervals of the images C221 to C223 and the images L221 to L226 are adjusted to a frame rate when displayed as live view images.

Therefore, in this example, the exposure time Te121 (>Te122) of the images C221 to C223 and the images L201 to L206 is set longer than the exposure time Te122 of the images C224 to C226.

As a result, the image data of the reduced images of the images C224 to C226 has an imaging interval shorter than the image data of the images C221 to C223 and the reduced images of the images L221 to L126, and is in a state of being captured at a frame rate higher than the frame rate of the live view image.

Therefore, when causing the display unit 64 to display the image data of the reduced image as a live view image, the display control unit 83 thins out and displays the reduced image so as to conform to the frame rate of the live view image.

That is, the display unit 64 displays the image data of the reduced image of the image C221 as a live view image from time t571 to t572, displays the image data of the reduced image of the image L221 as a live view image from time t572 to t573, and displays the image data of the reduced image of the image L222 as a live view image from time t573 to t574.

Thereafter, since the image data of the reduced image is generated in accordance with the frame rate of a live view image up to t577, the display unit 64 displays the image data of the reduced image of the image C222 as a live view image from time t574 to t575.

Then, thereafter, similarly, the display unit 64 displays the image data of the reduced image of the image L223 as a live view image from time t575 to t576, displays the image data of the reduced image of the image L224 as a live view image from time t576 to t577, and displays the image data of the reduced image of the image C223 as a live view image from time t577 to t578.

Here, since the images C224 to C226 are continuously captured at high speed, the display unit 64 thins out and displays the image data of the reduced images of the image C225 in accordance with the frame rate related to the display of the live view images in order to display the image data of the reduced images as live view images.

That is, the display unit 64 displays the image data of the reduced image of the image C224 as a live view image from time t578 to t579, and thins out the image data of the reduced image of the image C225 and displays the image data of the reduced image of the image C226 as a live view image from time t579 to t580.

Then, as for the following images L225 to L226, the images are captured at an imaging interval corresponding to the frame rate related to the display of live view images, the images are sequentially displayed as they are.

That is, the display unit 64 displays the image data of the reduced image of the image L225 as a live view image from time t579 to t580, and displays the image data of the reduced image of the image L226 as a live view image from time t580 to t581.

By the above processing, it is possible to display the live view images while switching the normal continuous imaging and the high-speed continuous imaging and displaying the live view images.

5. Modification of Second Embodiment

In the above, an example of a configuration in which the sensor unit 141 and the temporary high-speed memory 92 are stacked in the image sensor 131 so that the image data can be transferred at high speed has been described. However, the sensor unit 141 and the temporary high-speed memory 92 may be separately configured as long as the image data can be transferred between the sensor unit 141 and the temporary high-speed memory 92 at high speed, similarly to the imaging device 11 of FIG. 8.

Figure 14:
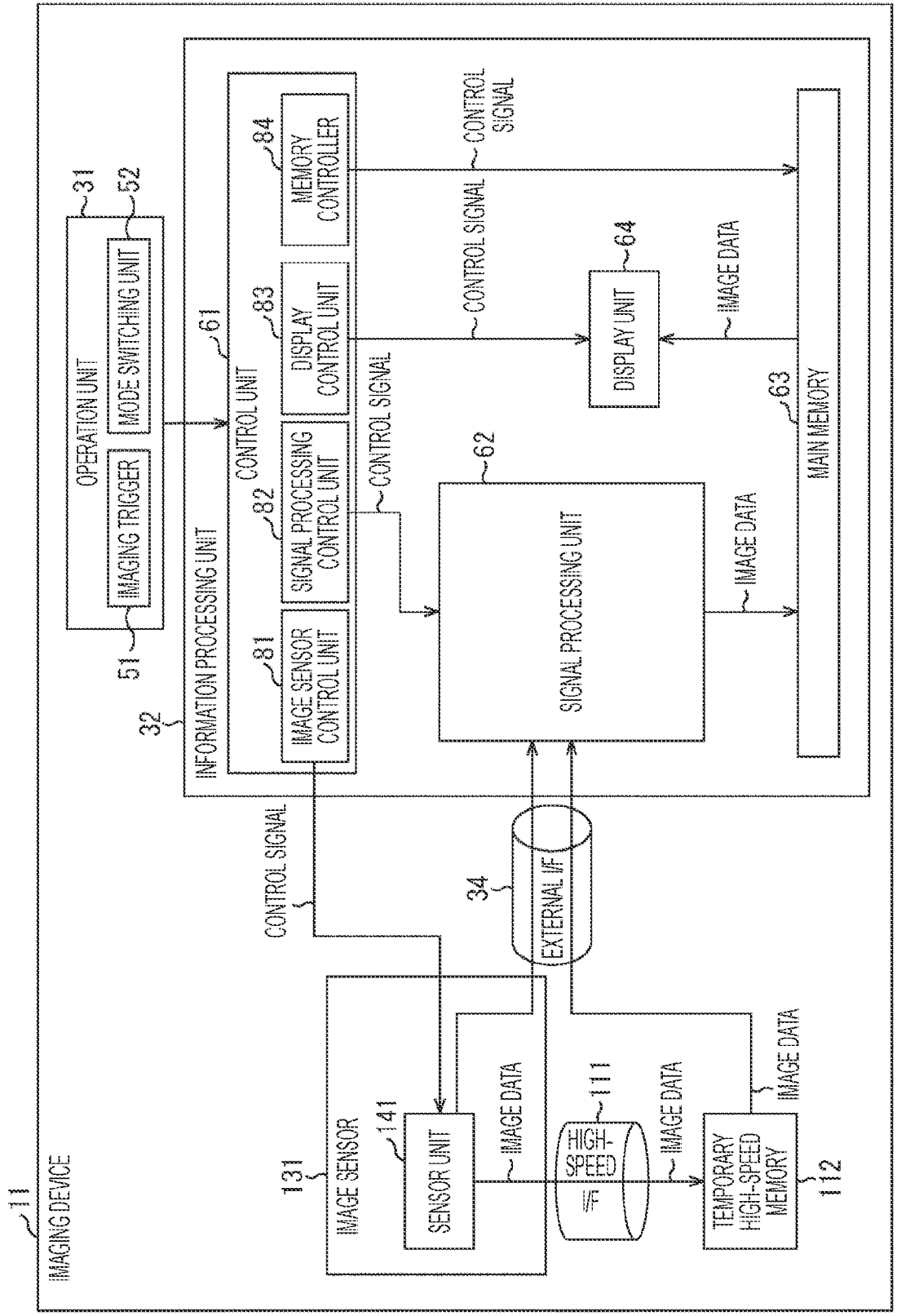
FIG. 14 is a block diagram for describing a modification of the second embodiment of the imaging device of the present disclosure.

For example, as illustrated in the imaging device 11 in FIG. 14, a temporary high-speed memory 112 may be provided outside the image sensor 131 instead of the temporary high-speed memory 92, and the sensor unit 141 and the temporary high-speed memory 112 in the image sensor 131 may be connected by a high-speed I/F 111.

Note that, in the imaging device 11 of FIG. 14, the substantial functions are similar to the imaging device 11 of FIG. 9 except that the temporary high-speed memory 112 having a similar function is connected to the sensor unit 91 via the high-speed I/F 111 instead of the temporary high-speed memory 92, and thus description thereof will be omitted.

Furthermore, the operation example by the imaging device 11 in FIG. 14 is also similar to that of the imaging device 11 in FIG. 9, and thus description thereof is omitted.

6. Example of Execution by Software

By the way, the above-described series of processing can be executed by hardware or software. In a case where the series of processing is executed by software, a program constituting the software is installed from a recording medium into a computer incorporated in special hardware, a general-purpose computer capable of executing various functions by installing various programs, or the like.

FIG. 15 illustrates a configuration example of a general-purpose computer. The personal computer incorporates a central processing unit (CPU) 1001. An input/output interface 1005 is connected to the CPU 1001 via a bus 1004. A read only memory (ROM) 1002 and a random access memory (RAM) 1003 are connected to the bus 1004.

To the input/output interface 1005, an input unit 1006 including an input device such as a keyboard and a mouse for a user to input operation commands, an output unit 1007 that outputs a processing operation screen and an image of a processing result to a display device, a storage unit 1008 including a hard disk drive or the like for storing programs and various data, and a communication unit 1009 including a local area network (LAN) adapter and the like and executing communication processing via a network typified by the Internet are connected. Furthermore, a drive 1010 that reads and writes data with respect to a removable storage medium 1011 such as a magnetic disk (including a flexible disk), an optical disk (including a compact disc-read only memory (CD-ROM) or a digital versatile disc (DVD)), a magneto-optical disk (including a mini disc (MD)), or a semiconductor memory is connected to the input/output interface 1005.

The CPU 1001 executes various types of processing according to a program stored in the ROM 1002 or a program read from the removable storage medium 1011 such as a magnetic disk, an optical disk, a magneto-optical disk, or a semiconductor memory, installed in the storage unit 1008, and loaded from the storage unit 1008 to the RAM 1003. Furthermore, the RAM 1003 appropriately stores data and the like necessary for the CPU 1001 to execute the various types of processing.

In the computer configured as described above, the CPU 1001, for example, loads the program stored in the storage unit 1008 into the RAM 1003 and executes the program via the input/output interface 1005 and the bus 1004, whereby the above-described series of processing is performed.

The program to be executed by the computer (CPU 1001) can be recorded on the removable storage medium 1011 as a package medium or the like, for example, and provided. Furthermore, the program can be provided via a wired or wireless transmission medium such as a local area network, the Internet, or digital satellite broadcast.

In the computer, the program can be installed to the storage unit 1008 via the input/output interface 1005 by attaching the removable storage medium 1011 to the drive 1010. Furthermore, the program can be received by the communication unit 1009 via a wired or wireless transmission medium and installed in the storage unit 1008. Other than the above method, the program can be installed in the ROM 1002 or the storage unit 1008 in advance.

Note that the program executed by the computer may be a program processed in chronological order according to the order described in the present specification or may be a program executed in parallel or at necessary timing such as when a call is made.

Note that the CPU 1001 in FIG. 15 implements the functions of the control unit 61 in FIGS. 2, 8, 9, and 14.

Furthermore, in the present specification, the term "system" means a group of a plurality of configuration elements (devices, modules (parts), and the like), and whether or not all the configuration elements are in the same casing is irrelevant. Therefore, a plurality of devices housed in separate casings and connected via a network, and one device that houses a plurality of modules in one casing are both systems.

Note that the embodiments of the present disclosure are not limited to the above-described embodiments, and various modifications can be made without departing from the gist of the present disclosure.

For example, the present disclosure can adopt a configuration of cloud computing in which one function is shared and processed in cooperation by a plurality of devices via a network.

Furthermore, the steps described in the above-described flowcharts can be executed by one device or can be shared and executed by a plurality of devices.

Moreover, in a case where a plurality of processes is included in one step, the plurality of processes included in the one step can be executed by one device or can be shared and executed by a plurality of devices.

Note that the present disclosure can have the following configurations.

<1> An imaging device including:
  a sensor unit configured to capture an image and transfer the captured image as image data; and
  a temporary memory configured to temporarily store the image data transferred from the sensor unit and then transfer the image data to a main memory, in which
  in a case where high-speed continuous imaging is instructed, the temporary memory sequentially stores a plurality of pieces of the image data transferred from the sensor unit at a predetermined speed in a state where the transfer of the image data to the main memory is stopped, and then sequentially transfers the plurality of pieces of stored image data to the main memory at a speed lower than the predetermined speed.

<2> The imaging device according to <1>, in which
  in the case where the high-speed continuous imaging is instructed, the temporary memory sequentially stores the image data transferred from the sensor unit at the predetermined speed by the plurality of pieces of storable image data in the state where the transfer of the image data to the main memory is stopped, and then sequentially transfers the plurality of pieces of stored image data to the main memory at a speed lower than the predetermined speed.

<3> The imaging device according to <1>, in which
  in the case where the high-speed continuous imaging is instructed, the temporary memory sequentially stores the image data transferred from the sensor unit at the predetermined speed until stop of the high-speed continuous imaging is instructed in the state where the transfer of the image data to the main memory is stopped, and then sequentially transfers the stored plurality of pieces of image data to the main memory at a speed lower than the predetermined speed.

<4> The imaging device according to <1>, in which
  the temporary memory constitutes a ring buffer, and in the case where the high-speed continuous imaging is instructed, the temporary memory sequentially stores the image data transferred at the predetermined speed from the sensor unit by the plurality of pieces of storable image data in the state where the transfer of the image data to the main memory is stopped until the instruction of the high-speed continuous imaging is stopped by overwriting the oldest image data with the latest image data, and sequentially transfers the plurality of pieces of stored image data to the main memory at a speed lower than the predetermined speed after stop of the high-speed continuous imaging is instructed.

<5> The imaging device according to <1>, in which
  the temporary memory functions as a configuration capable of storing image data of one image in a case where normal continuous imaging is instructed, and the temporary memory repeats processing of temporarily storing image data and then transferring the image data to the main memory when the image data is transferred at the predetermined speed from the sensor unit, and then next, temporarily storing new image data transferred at the predetermined speed from the sensor unit and then transferring the new image data to the main memory, until stop of the normal continuous imaging is instructed.

<6> The imaging device according to <5>, further including
  an operation unit configured to instruct the high-speed continuous imaging and the normal continuous imaging, in which
  the operation unit switches and instructs the high-speed continuous imaging and the normal continuous imaging according to an operation mode.

<7> The imaging device according to <6>, further including
  a mode switching unit configured to switch the operation mode of the operation unit, in which
  the operation mode of the operation unit is switched between the operation mode of the high-speed continuous imaging and the operation mode of the normal continuous imaging by the mode switching unit.

<8> The imaging device according to <1>, further including
  a display unit configured to display an image stored in the main memory, in which
  the sensor unit further directly transfers image data of a low-resolution image obtained by thinning pixels of the captured image to the main memory, and
  the display unit displays the image data of the low-resolution image as a live view image.

<9> The imaging device according to <8>, in which
  the display unit selects and displays the image data of the low-resolution image in accordance with a frame rate of the live view image among the image data of the low-resolution image directly transferred to the main memory.

<10> The imaging device according to <9>, in which
  the display unit thins, selects, and displays predetermined image data of the low-resolution image in accordance with the frame rate of the live view image among the image data of the low-resolution image directly transferred to the main memory.

<11> The imaging device according to <9>, in which the display unit continuously selects and displays predetermined image data of the low-resolution image in accordance with the frame rate of the live view image among the image data of the low-resolution image directly transferred to the main memory.

<12> The imaging device according to any one of <1> to <11>, in which in the case where the high-speed continuous imaging is instructed, the sensor unit captures the plurality of images with a same exposure time.

<13> The imaging device according to any one of <1> to <11>, in which in the case where the high-speed continuous imaging is instructed, the sensor unit captures the plurality of images with different exposure times.

<14> The imaging device according to any one of <1> to <13>, in which the temporary memory is stacked on the sensor unit and provided as an integrated configuration.

<15> The imaging device according to any one of <1> to <13>, in which the temporary memory is provided separately from the sensor unit via an interface capable of transferring the image data at the predetermined speed.

<16> An imaging method of an imaging device including a sensor unit configured to capture an image and transfer the captured image as image data, and a temporary memory configured to temporarily store the image data transferred from the sensor unit and then transfer the image data to a main memory, the imaging method including:
by the temporary memory, in a case where high-speed continuous imaging is instructed, sequentially storing a plurality of pieces of the image data transferred from the sensor unit at a predetermined speed in a state where the transfer of the image data to the main memory is stopped, and then sequentially transferring the plurality of pieces of stored image data to the main memory at a speed lower than the predetermined speed.

REFERENCE SIGNS LIST

11 Imaging device
31 Operation unit
32 Information processing unit
33 Image sensor
34 External I/F
51 Imaging trigger
52 Mode switching unit
61 Control unit
62 Signal processing unit
63 Main memory
64 Display unit
81 Image sensor control unit
82 Signal processing control unit
83 Display control unit
84 Memory controller
91 Sensor unit
92 Temporary high-speed memory
111 High-speed I/F
112 Temporary high-speed memory
131 Image sensor
141 Sensor unit

The invention claimed is:

1. An imaging device, comprising:
a sensor unit configured to capture an image and transfer the captured image as image data; and
a temporary memory configured to:
temporarily store the image data transferred from the sensor unit; and
transfer the image data to a main memory, wherein
in a case where high-speed continuous imaging is instructed, the temporary memory is further configured to:
sequentially store a plurality of pieces of the image data, corresponding to a plurality of images, transferred from the sensor unit at a determined speed in a state where the transfer of the image data to the main memory is stopped, wherein the plurality of images includes the captured image; and
sequentially transfer the stored plurality of pieces of the image data to the main memory after a stop of the high-speed continuous imaging is instructed, wherein the stored plurality of pieces of the image data is transferred to the main memory at a speed lower than the determined speed.

2. The imaging device according to claim 1, wherein in the case where the high-speed continuous imaging is instructed, the temporary memory is further configured to:
sequentially store the plurality of pieces of the image data transferred from the sensor unit at the determined speed by a plurality of pieces of storable image data in the state where the transfer of the image data to the main memory is stopped; and
sequentially transfer the stored plurality of pieces of the image data to the main memory at the speed lower than the determined speed.

3. The imaging device according to claim 1, wherein in the case where the high-speed continuous imaging is instructed, the temporary memory is further configured to:
sequentially store the plurality of pieces of the image data transferred from the sensor unit at the determined speed until the stop of the high-speed continuous imaging is instructed in the state where the transfer of the image data to the main memory is stopped; and
sequentially transfer the stored plurality of pieces of the image data to the main memory at the speed lower than the determined speed.

4. The imaging device according to claim 3, wherein the temporary memory constitutes a ring buffer, and in the case where the high-speed continuous imaging is instructed, the temporary memory is further configured to:
sequentially store the image data transferred at the determined speed from the sensor unit by a plurality of pieces of storable image data in the state where the transfer of the image data to the main memory is stopped until the instruction of the high-speed continuous imaging is stopped by overwriting oldest image data with latest image data; and
sequentially transfer the stored plurality of pieces of the image data to the main memory at the speed lower than the determined speed after the stop of the high-speed continuous imaging is instructed.

5. The imaging device according to claim 1, wherein in a case where normal continuous imaging is instructed, the temporary memory is further configured to:
function as a configuration capable of storing the image data of one image;

temporarily store the image data and then transfer the image data to the main memory after the image data is transferred at the determined speed from the sensor unit; and temporarily store new image data transferred at the determined speed from the sensor unit and then transfer the new image data to the main memory, until stop of the normal continuous imaging is instructed.

6. The imaging device according to claim 5, further comprising an operation unit configured to:
instruct the high-speed continuous imaging and the normal continuous imaging; and
switch and instruct the high-speed continuous imaging and the normal continuous imaging according to an operation mode.

7. The imaging device according to claim 6, further comprising a mode switching unit configured to switch the operation mode of the operation unit, wherein the operation mode of the operation unit is switched between the operation mode of the high-speed continuous imaging and the operation mode of the normal continuous imaging by the mode switching unit.

8. The imaging device according to claim 1, further comprising a display unit configured to display an image stored in the main memory, wherein
the sensor unit is further configured to directly transfer the image data of a low-resolution image obtained by thinning pixels of the captured image to the main memory, and
the display unit is further configured to display the image data of the low-resolution image as a live view image.

9. The imaging device according to claim 8, wherein the display unit is further configured to select and display the image data of the low-resolution image in accordance with a frame rate of the live view image among the image data of the low-resolution image directly transferred to the main memory.

10. The imaging device according to claim 9, wherein the display unit is further configured to thin, select, and display determined image data of the low-resolution image in accordance with the frame rate of the live view image among the image data of the low-resolution image directly transferred to the main memory.

11. The imaging device according to claim 9, wherein the display unit is further configured to continuously select and display determined image data of the low-resolution image in accordance with the frame rate of the live view image among the image data of the low-resolution image directly transferred to the main memory.

12. The imaging device according to claim 1, wherein in the case where the high-speed continuous imaging is instructed, the sensor unit is further configured to capture the plurality of images with a same exposure time.

13. The imaging device according to claim 1, wherein in the case where the high-speed continuous imaging is instructed, the sensor unit is further configured to capture the plurality of images with different exposure times.

14. The imaging device according to claim 1, wherein the temporary memory is stacked on the sensor unit.

15. The imaging device according to claim 1, wherein the temporary memory is separated from the sensor unit via an interface that transfers the image data at the determined speed.

16. An imaging method, comprising:
in an imaging device including a sensor unit configured to capture an image and transfer the captured image as image data, and a temporary memory configured to temporarily store the image data transferred from the sensor unit and transfer the image data to a main memory:
in a case where high-speed continuous imaging is instructed, sequentially storing a plurality of pieces of the image data, corresponding to a plurality of images, transferred from the sensor unit at a determined speed in a state where the transfer of the image data to the main memory is stopped, wherein the plurality of images includes the captured image; and
sequentially transferring the stored plurality of pieces of the image data to the main memory after a stop of the high-speed continuous imaging is instructed, wherein the stored plurality of pieces of the image data is transferred to the main memory at a speed lower than the determined speed.

17. An imaging device, comprising:
a sensor unit configured to capture an image and transfer the captured image as image data; and
a temporary memory configured to:
temporarily store the image data transferred from the sensor unit; and
transfer the image data to a main memory, wherein
in a case where high-speed continuous imaging is instructed, the temporary memory is further configured to:
sequentially store a plurality of pieces of the image data transferred from the sensor unit at a determined speed in a state where the transfer of the image data to the main memory is stopped; and
sequentially transfer the stored plurality of pieces of the image data to the main memory at a speed lower than the determined speed, and
in a case where normal continuous imaging is instructed, the temporary memory is further configured to:
function as a configuration capable of storing the image data of one image;
temporarily store the image data and then transfer the image data to the main memory after the image data is transferred at the determined speed from the sensor unit; and
temporarily store new image data transferred at the determined speed from the sensor unit and then transfer the new image data to the main memory, until stop of the normal continuous imaging is instructed.

* * * * *